United States Patent
Rogers

(10) Patent No.: US 11,460,140 B2
(45) Date of Patent: Oct. 4, 2022

(54) MINI-DAMPENERS AT PUMP COMBINED WITH SYSTEM PULSATION DAMPENER

(71) Applicant: Performance Pulsation Control, Inc., Richardson, TX (US)

(72) Inventor: John Thomas Rogers, Garland, TX (US)

(73) Assignee: Performance Pulsation Control, Inc., Richardson, TX (US)

(*) Notice: Subject to any disclaimer, the term of this patent is extended or adjusted under 35 U.S.C. 154(b) by 6 days.

(21) Appl. No.: 16/730,621

(22) Filed: Dec. 30, 2019

(65) Prior Publication Data

US 2020/0132237 A1 Apr. 30, 2020

Related U.S. Application Data

(63) Continuation-in-part of application No. 16/404,248, filed on May 6, 2019, and a continuation-in-part of
(Continued)

(51) Int. Cl.
*F16L 55/04* (2006.01)
*F04B 11/00* (2006.01)
(Continued)

(52) U.S. Cl.
CPC .......... *F16L 55/04* (2013.01); *F04B 11/0091* (2013.01); *F04B 39/0027* (2013.01); *F04B 11/0008* (2013.01); *F04B 23/04* (2013.01)

(58) Field of Classification Search
CPC ...................................................... F15D 1/025
(Continued)

(56) References Cited

U.S. PATENT DOCUMENTS 2,290,337 A  7/1942  Knauth
2,757,689 A  8/1956  Knox
(Continued)

FOREIGN PATENT DOCUMENTS

SU    1686246 A1   10/1991
WO  2019/083736 A1   5/2019

OTHER PUBLICATIONS

Final Office Action dated Apr. 16, 2021 in connection with U.S. Appl. No. 16/404,248, 18 pages.
(Continued)

*Primary Examiner* — Robert K Arundale
*Assistant Examiner* — Richard K. Durden

(57) ABSTRACT

A multi-pump pump system includes at least two pumps and a system pulsation dampener sized and configured to reduce a magnitude of pressure pulsations within a combined flow output by the at least two pumps, together with at least one mini-dampener coupled between the outlet of one of the pumps and header pipe(s) carrying flow from one of the pumps into the system pulsation dampener, the at least one mini-dampener sized and configured to reduce the magnitude of pressure pulsations over the system pulsation dampener alone. Optionally, a mini-dampener may be coupled between each pump and the system pulsation dampener. A single header pipe may carry combined flow from the at least two pumps into the system pulsation dampener, or separate header pipes may carry individual flows from the pumps into the system pulsation dampener.

14 Claims, 21 Drawing Sheets

Related U.S. Application Data application No. 16/157,952, filed on Oct. 11, 2018, said application No. 16/404,248 is a continuation-in-part of application No. 16/157,952, filed on Oct. 11, 2018.

(60) Provisional application No. 62/866,501, filed on Jun. 25, 2019, provisional application No. 62/635,574, filed on Feb. 16, 2018, provisional application No. 62/577,567, filed on Oct. 26, 2017.

(51) Int. Cl.
*F04B 23/04* (2006.01)
*F04B 39/00* (2006.01)

(58) Field of Classification Search
USPC .......................................................... 138/40
See application file for complete search history.

(56) References Cited

U.S. PATENT DOCUMENTS

| | | | |
|---|---|---|---|
| 2,773,455 A | 12/1956 | Mercier | |
| 3,444,897 A | 5/1969 | Erickson | |
| 3,587,652 A | 6/1971 | Remus | |
| 3,665,965 A | 5/1972 | Baumann | |
| 3,731,709 A | 5/1973 | Glover | |
| 3,840,051 A | 10/1974 | Akashi et al. | |
| 3,894,562 A | 7/1975 | Moseley, Jr. et al. | |
| 4,269,569 A | 5/1981 | Hoover | |
| 4,445,829 A | 5/1984 | Miller | |
| 4,514,151 A | 4/1985 | Anders et al. | |
| 4,570,745 A * | 2/1986 | Sparks | F16L 55/04 138/26 |
| 4,585,400 A | 4/1986 | Miller | |
| 4,644,974 A | 2/1987 | Zingg | |
| 5,495,872 A | 3/1996 | Gallagher et al. | |
| 5,868,168 A | 2/1999 | Mott et al. | |
| 6,741,185 B2 | 5/2004 | Shi et al. | |
| 6,848,477 B2 | 2/2005 | Treusch et al. | |
| 7,051,765 B1 | 5/2006 | Kelley et al. | |
| 7,123,161 B2 | 10/2006 | Jeffryes et al. | |
| 7,198,102 B2 | 4/2007 | Virally et al. | |
| 7,345,594 B2 | 3/2008 | Huang et al. | |
| 8,449,500 B2 * | 5/2013 | DelCastillo | A61M 5/14212 604/151 |
| 9,845,795 B2 | 12/2017 | Manley et al. | |
| 2006/0109141 A1 | 5/2006 | Huang et al. | |
| 2012/0152360 A1 | 6/2012 | Marica | |
| 2012/0189477 A1 * | 7/2012 | Rogers | F04B 39/0055 417/540 |
| 2013/0037153 A1 | 2/2013 | Schommer | |
| 2014/0076577 A1 | 3/2014 | Shampine | |
| 2014/0118157 A1 | 5/2014 | Jamison | |
| 2015/0064027 A1 | 3/2015 | Leugemors et al. | |
| 2015/0240982 A1 | 8/2015 | Eisner et al. | |
| 2015/0284811 A1 | 10/2015 | Knight et al. | |
| 2017/0067456 A1 | 3/2017 | Manley et al. | |
| 2017/0130706 A1 | 5/2017 | Plaza et al. | |
| 2017/0159868 A1 | 6/2017 | Fisher | |
| 2018/0128410 A1 | 5/2018 | Rogers | |
| 2019/0128462 A1 | 5/2019 | Rogers | |
| 2019/0257462 A1 | 8/2019 | Rogers | |
| 2019/0285220 A1 | 9/2019 | Eros et al. | |
| 2019/0293058 A1 | 9/2019 | Manley | |
| 2020/0132237 A1 | 4/2020 | Rogers | |

OTHER PUBLICATIONS

Final Office Action dated May 7, 2021 in connection with U.S. Appl. No. 16/157,952, 17 pages.
Notification of Transmittal of the International Search Report and the Written Opinion of the International Searching Authority, or the Declaration dated Jul. 21, 2020 in connection with International Patent Application No. PCT/US2020/31335, 10 pages.
Notification of Transmittal of the International Search Report and the Written Opinion of the International Searching Authority, or the Declaration dated Jul. 31, 2020 in connection with International Patent Application No. PCT/US2020/31698, 9 pages.
Office Action dated Oct. 8, 2020 in connection with U.S. Appl. No. 16/157,952, 18 pages.
Office Action dated Oct. 13, 2020 in connection with U.S. Appl. No. 16/404,248, 16 pages.
International Search Report and Written Opinion of the International Searching Authority regarding International Application No. PCT/US2018/055485, dated Dec. 10, 2018, 13 pages.
Office Action dated Sep. 27, 2021 in connection with U.S. Appl. No. 16/157,952, 28 pages.
Interview Summary dated Oct. 29, 2021 in connection with U.S. Appl. No. 16/157,952, 3 pages.
Office Action dated Dec. 13, 2021 in connection with U.S. Appl. No. 16/404,248, 9 pages.
United States Trademark Registration No. 5,127,212—Charge Free Conversion Kit, 2 pages, Registered Jan. 24, 2017.
Sigma Drilling Technology, LLC, commercial website, screenshots obtained Nov. 22, 2019; effective date Oct. 1, 2014—see Sigma Drilling Technologies "Terms & Conditions" final sentence, 23 pages.
Hon. Amos L. Mazzant, III, Report on the Filing or Determination of an Action Regarding a Patent or Trademark Re: U.S. Appl. No. 61/878,174, dated Sep. 16, 2013, Justin Manley; U.S. Appl. No. 62/037,901, dated Aug. 14, 2014, Justin Manley; U.S. Appl. No. 14/846,872, dated Sep. 7, 2015, Justin Manley and William Garfield, Judgment Entered May 9, 2019; Case 4:17-cv-00450-ALM *Performance Pulsation Control, Inc. v. Sigma Drilling Technologies, LLC, Justin P. Manley, et al.* United States District Court, Eastern District of Texas, Sherman Division, 1 page.
International Search Report and Written Opinion of the International Searching Authority dated Jan. 19, 2022, in connection with International Application No. PCT/US2021/054621, 9 pages.
Final Office Action dated May 24, 2022, in connection with U.S. Appl. No. 16/157,952, 28 pages.
Notice of Allowance dated Jun. 9, 2022, in connection with U.S. Appl. No. 16/404,248, 17 pages.
Non-final Office Action dated Jun. 13, 2022, in connection with U.S. Appl. No. 17/450,673, 15 pages.
Office Action dated Jun. 16, 2022, in connection with Algerian Application No. DZ/P/2021/000753, 3 pages.
Examination report dated Apr. 29, 2022, in connection with Indian Application No. 202127055212, 5 pages.
Examination report dated Aug. 16, 2022, in connection with Indian Application No. 202127055213, 5 pages.

\* cited by examiner

MINI-DAMPENERS AT PUMP COMBINED WITH SYSTEM PULSATION DAMPENER

PRIORITY CLAIM

This application is a continuation-in-part of U.S. Non-Provisional patent application Ser. No. 16/404,248 filed May 6, 2019 and entitled SYSTEM PULSATION DAMPENER DEVICE(S) SUBSTITUTING FOR PULSATION DAMPENERS UTILIZING COMPRESSION MATERIAL THEREIN and a continuation-in-part of U.S. Non-Provisional patent application Ser. No. 16/157,952 filed Oct. 11, 2018 and entitled SYSTEM PULSATION DAMPENER DEVICE(S), published as U.S. Patent Application Publication No. 2019/0128462, and claims priority to: U.S. Provisional Patent Application No. 62/866,501 filed Jun. 25, 2019 and entitled MINI-DAMPENERS AT PUMP COMBINED WITH SYSTEM PULSATION DAMPENER; U.S. Provisional Patent Application No. 62/635,374 filed Feb. 26, 2018 and entitled SYSTEM PULSATION DAMPENER DEVICE (S); and U.S. Provisional Patent Application No. 62/577,567 filed Oct. 26, 2017 and entitled COMBINATION STANDPIPE MANIFOLD AND PULSATION DAMPENER DEVICE. The content of the above-identified patent documents is incorporated herein by reference.

TECHNICAL FIELD

The present application relates generally to the operation of reciprocating fluid transfer systems and, more specifically, to providing one or more pulsation control products and/or devices before and after fluid flow aggregation structures, such as after multi-flow fluid stream consolidation.

BACKGROUND

Pulsation control in fluid transfer systems is in constant need of improvement. Among the improvements desirable are reducing pulsation amplitudes from pumps to the downstream system and increasing flexibility in integration of pulsation dampeners with other elements of an overall pump system while optimizing performance of pulsation dampening and efficiently utilizing available space within the region of the pump system.

SUMMARY

A multi-flow fluid delivery system includes a system pulsation dampener coupled before or after multi-flow fluid stream consolidation for a piping network fed by multiple pumps, together with mini-dampeners at the outlet of at least one of the pumps. The system and "mini" pulsation dampener device(s) may each provide a fluid volume for maintenance-free dampening of fluid pressure pulses. Each of the system pulsation dampener device and the mini-dampener devices is sized so that the collective pressure dampening performance, including existing appendage dampeners, is aligned with the characteristics of the particular pump network.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged standpipe manifold dampener or system dampener that can be used to control or partially control pulsation amplitudes.

Reciprocating systems, such as reciprocating pump systems and similar equipment, operate in many types of cyclic hydraulic applications. For example, reciprocating mud pump systems are used to circulate the mud or drilling fluid on a drilling rig. Pressure peaks within the pumped fluid accelerate, with each pulsation, the deterioration of the pump, the pump's fluid end expendable parts, and equipment downstream from the pump, such as measurement equipment used to determine drilling parameters, and washpipe and washpipe packing. Failure to control such pressure peaks inevitably affect the operating performance and operational life of the pump, pump fluid end expendable parts and all upstream or downstream components. Pressure peaks may also interfere with instrument signal detection, such that failure to control pressure peaks may also affect the signal detection and/or quality of the signal detection in (for example) measurement while drilling operations.

Pulsation control equipment is typically placed immediately upstream or downstream from a reciprocating pump, often with a relative size and configuration proportional to the volume of desired fluid displacement per stroke of the pump and the maximum allotted magnitude of the pressure peaks that may be experienced by the pump system during each pulsation. Pulsation control equipment thus aids in reducing pump loads and minimizing pulsation amplitudes to the pump, the pump's fluid end expendable parts and to equipment upstream or downstream. As a result, pulsation control equipment increases the relative operating performance and life of the pump, the pump's fluid end expendable parts and any equipment upstream or downstream from the pump.

However, pulsations may be experienced further downstream from the mud pumps as well, as fluid travels through piping towards the intended destination. These pulsations may be exacerbated when the fluid need to be diverted down a different path, or when multiple streams of fluid need to be combined and redirected into a single stream. Most systems do not account for these downstream pulsations. These downstream pulsations can cause damage to downstream components and increased noise for downstream measurement instruments and sensors.

Figure 1:
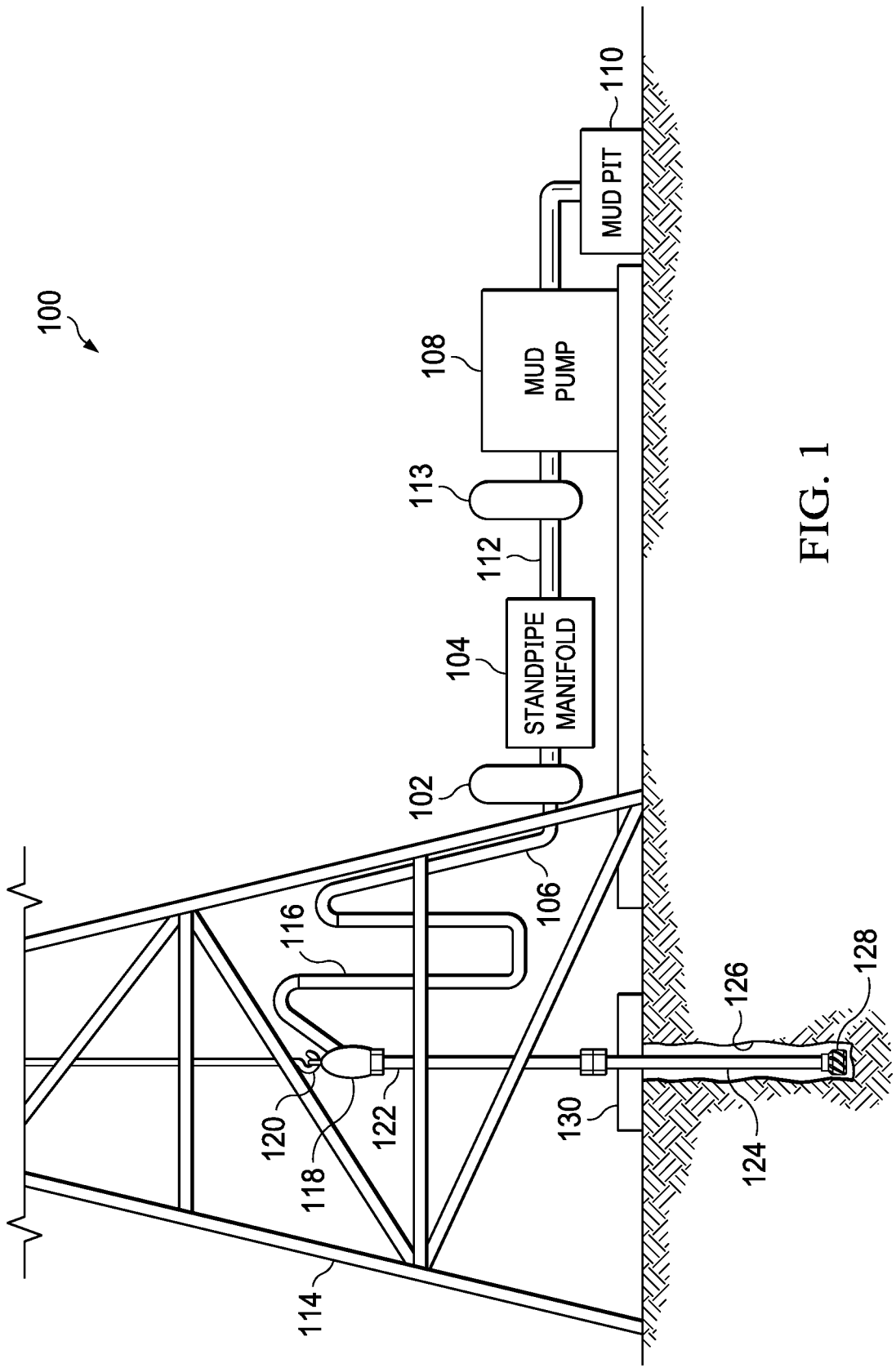
FIG. 1 illustrates a diagrammatic view of a drilling system including a pulsation dampener installed between a standpipe manifold and a standpipe according to various embodiments of the present disclosure.
Figure 2:
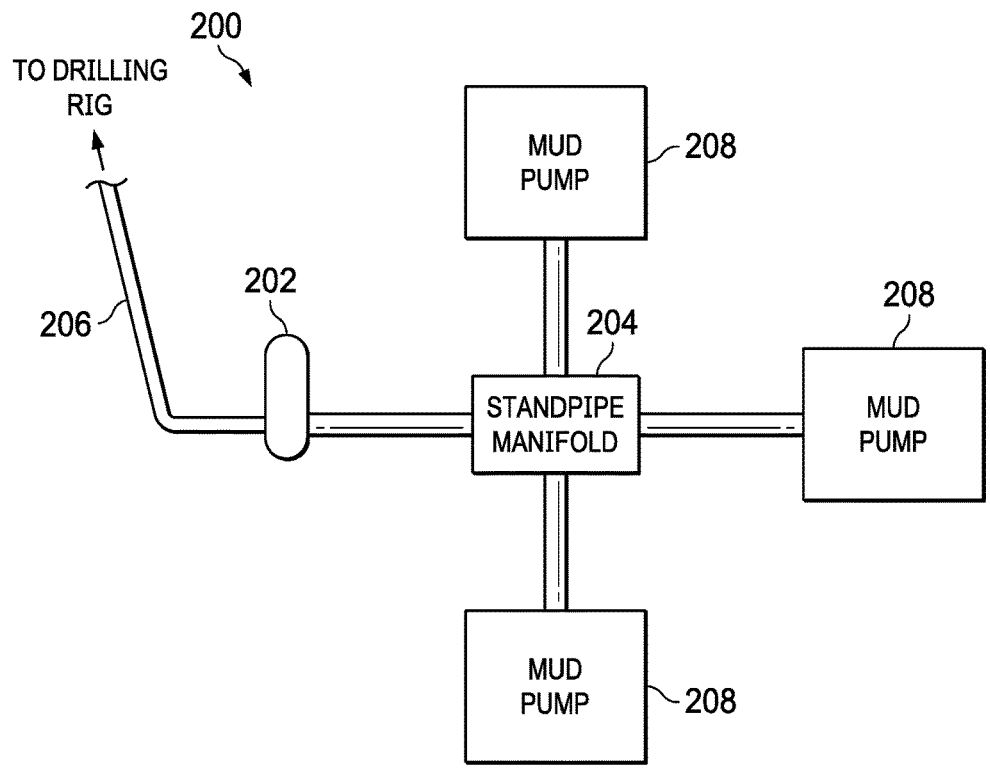
FIG. 2 illustrates a diagrammatic view of a portion of a system for fluid delivery, drilling, or both that includes a plurality of mud pumps according to various embodiments of the present disclosure, which may be used in embodiments of a drilling system that include a system pulsation dampener installed between a standpipe manifold and a standpipe as depicted in FIG. 1.
Figure 3:
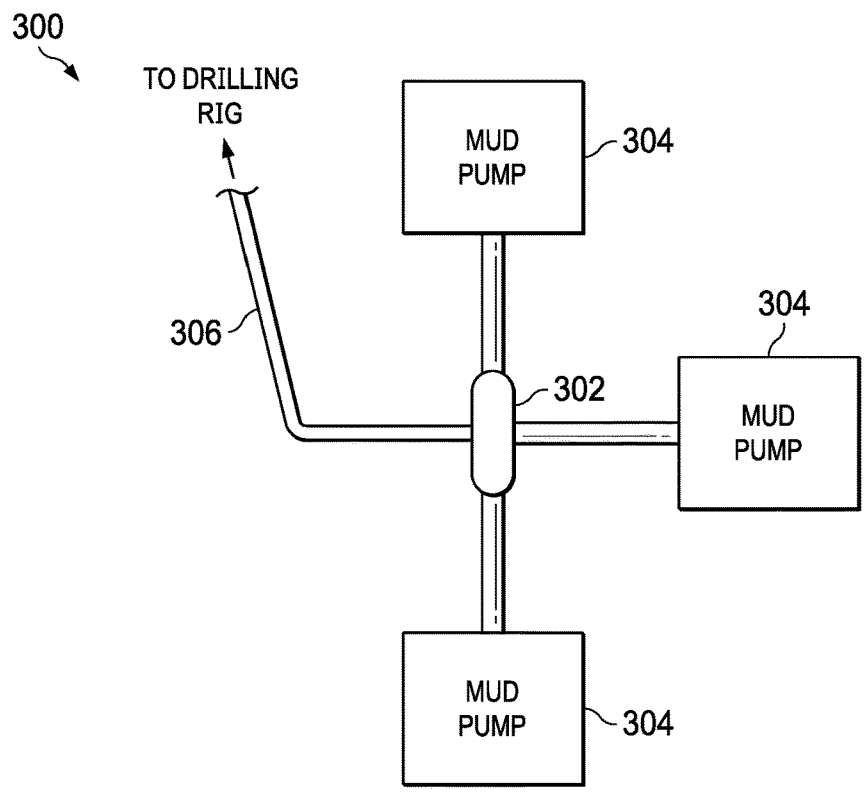
FIG. 3 illustrates a diagrammatic view of a portion of a system fluid delivery, drilling, or both including a combination standpipe manifold and pulsation dampener in one system device, the standpipe manifold system dampener according to various embodiments of the present disclosure, which may also be used in embodiments of a drilling system that include a system pulsation dampener installed between the mud pump(s) and a standpipe as depicted in FIG. 1.
Figure 4:
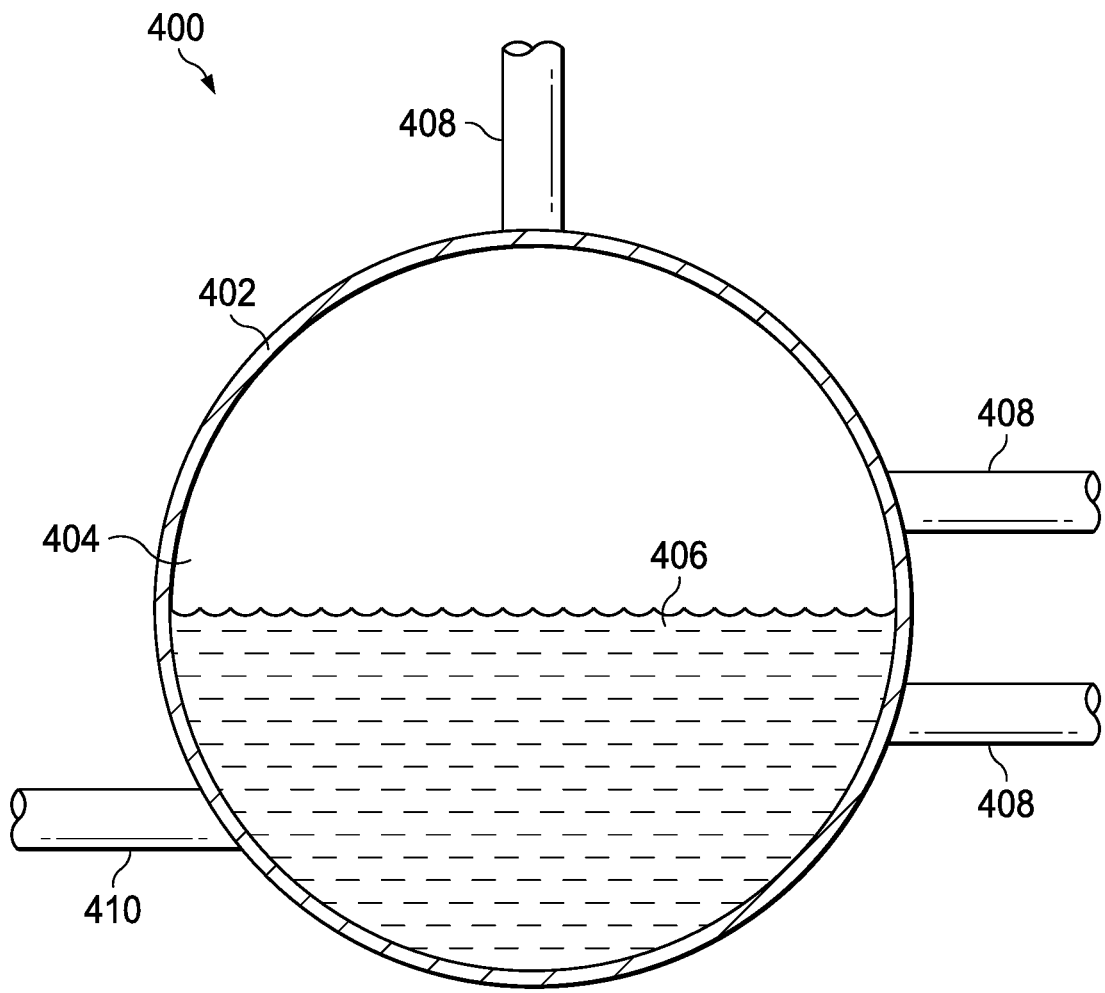
FIG. 4 illustrates one combination standpipe manifold and system pulsation dampener according to various embodiments of the present disclosure.
Figure 5:
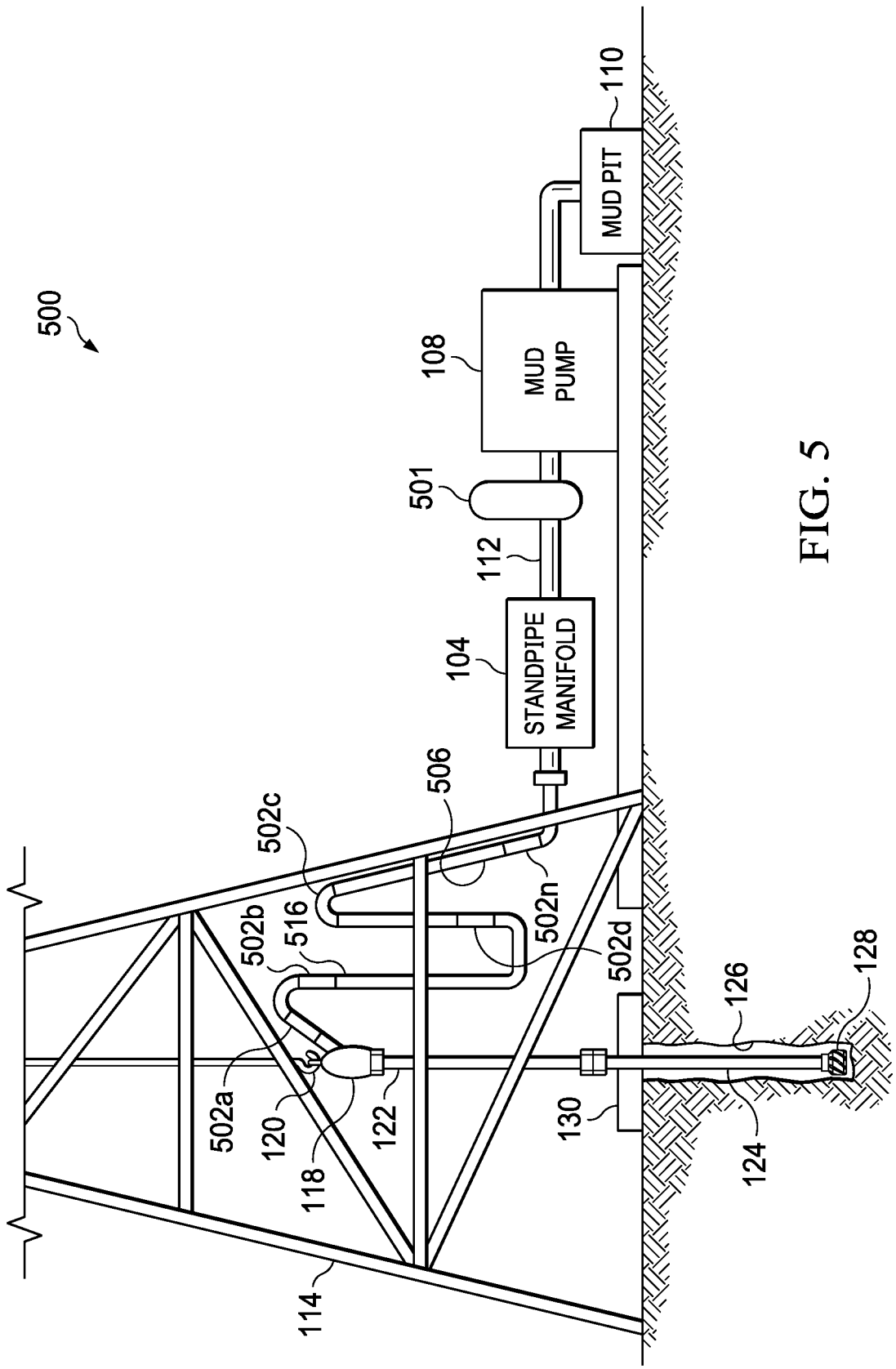
FIG. 5 is a diagrammatic view of a drilling system including an alternative pulsation dampener mechanism that may be installed in, proximate to, or downstream of a standpipe according to various embodiments of the present disclosure.
Figure 6A:
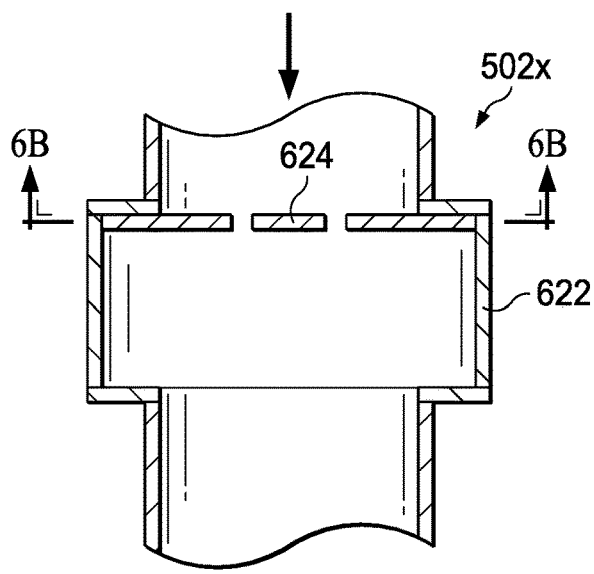
FIGS. 6A through 6E are enlarged diagrammatic views of various designs for system pulsation dampener device(s) implementing the pulsation dampening orifice assembly portion(s) of FIG. 5, used as system pulsation dampening device(s)
Figure 6B:
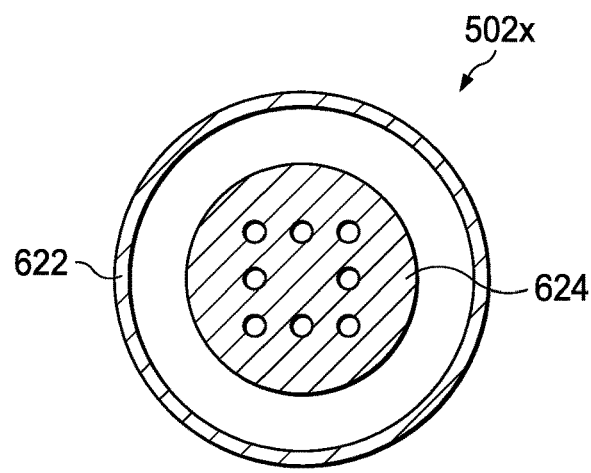
Figure 6C:
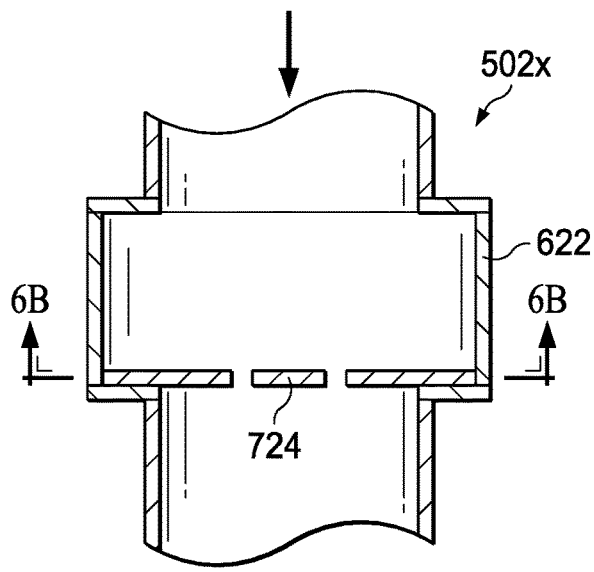
Figure 6D:
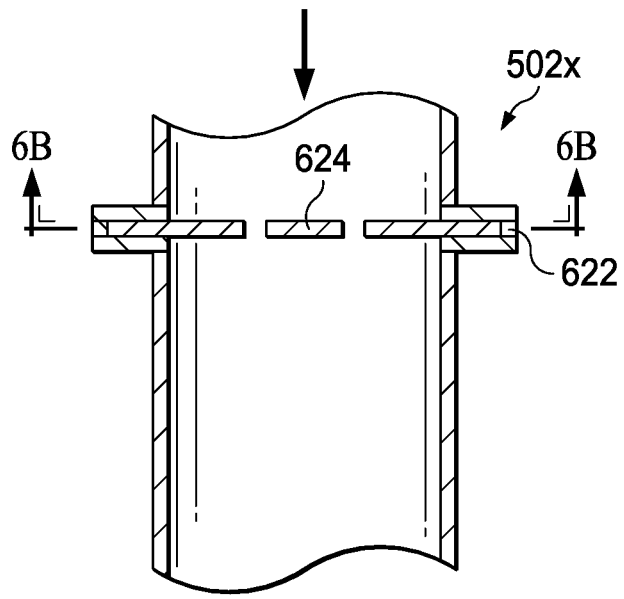
Figure 6E:
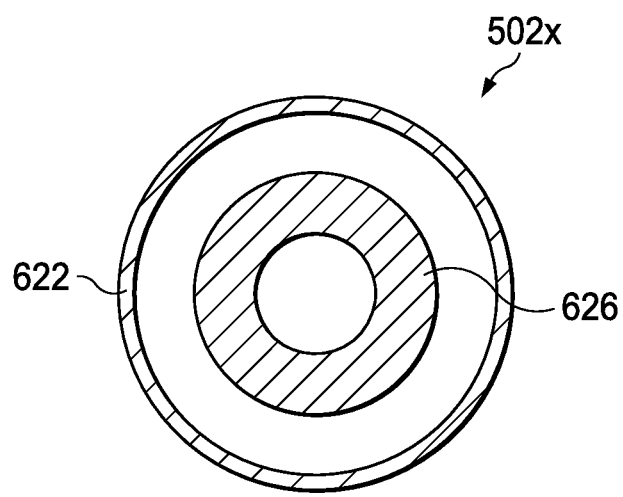
Figure 7:
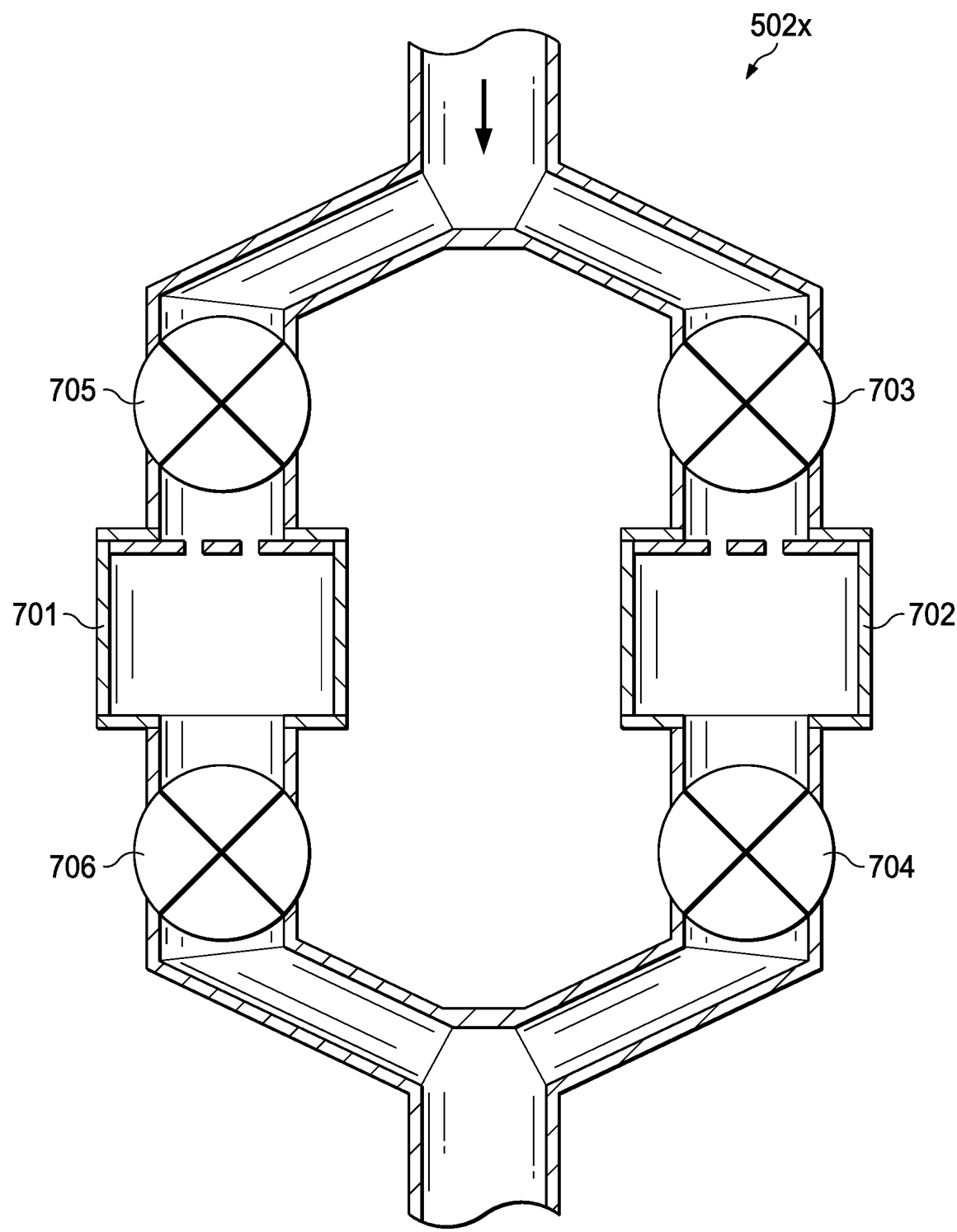
FIG. 7 is a diagrammatic view of an alternate design, with redundancy, for system pulsation dampener device(s) that may be installed in, proximate to, or downstream of a standpipe according to various embodiments of the present disclosure to implement the pulsation dampening orifice assembly portion(s) of FIG. 5.
Figure 8:
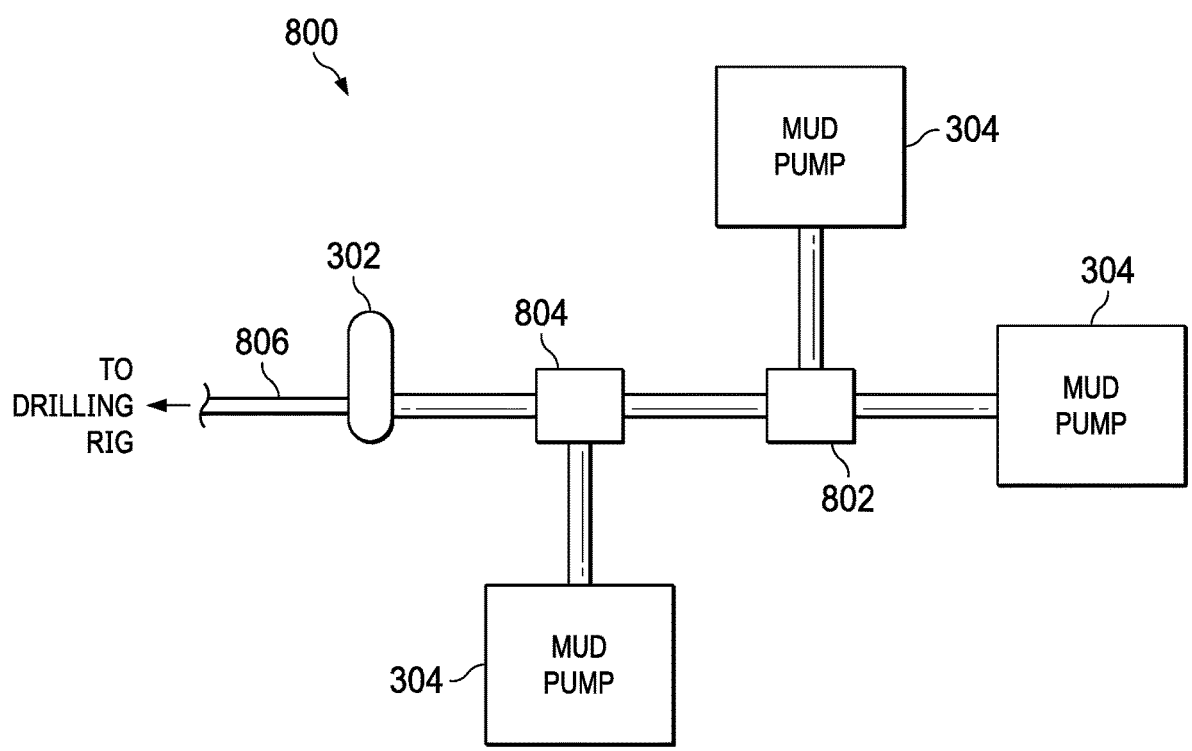
FIG. 8 illustrates a diagrammatic view of a fluid delivery or drilling system including fittings combining multiple fluid flow streams according to various embodiments of the present disclosure, which may also be used in embodiments of a drilling system that include a system pulsation dampener installed after the fittings combining multiple fluid flow streams.
Figure 13:
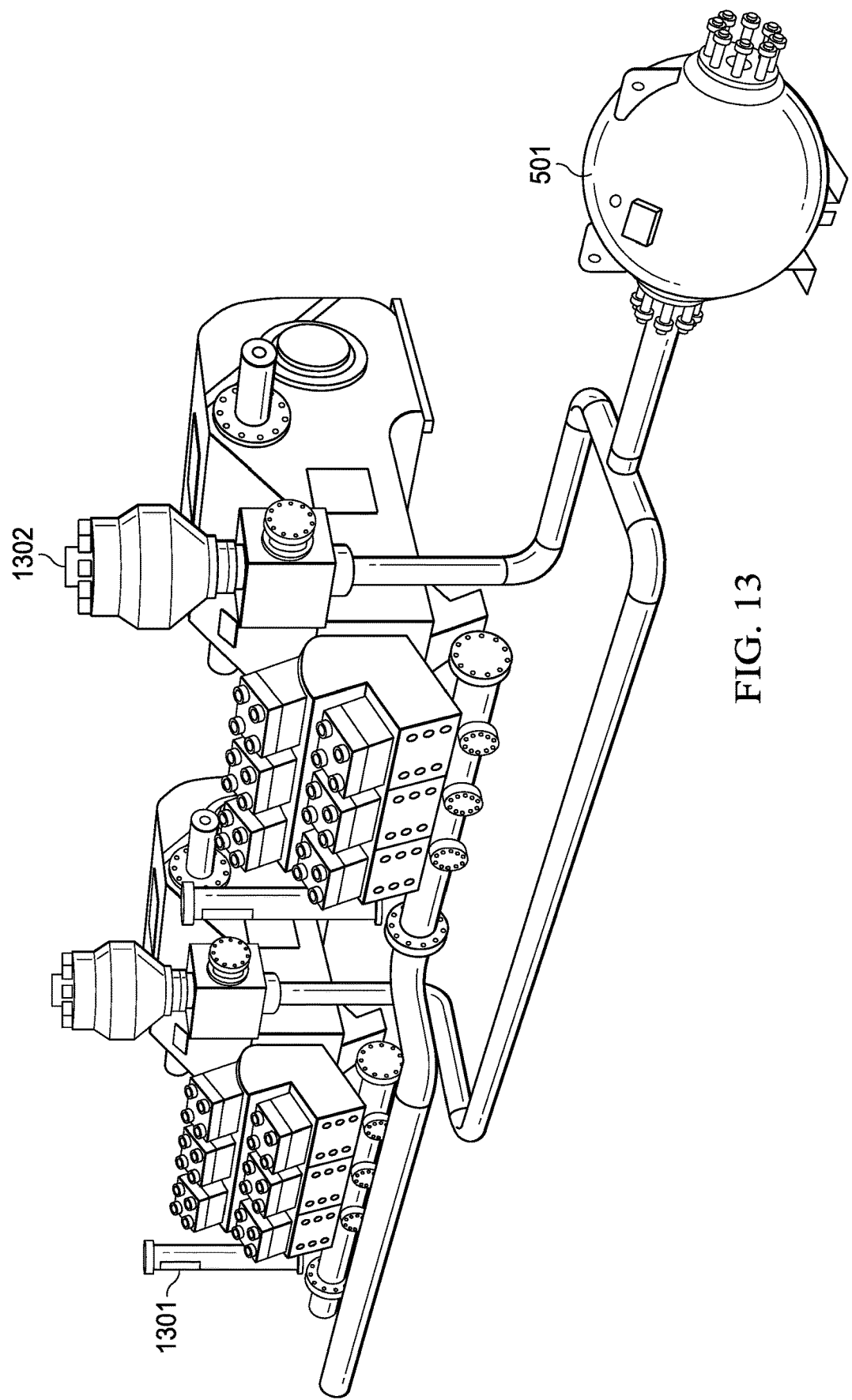
FIG. 13 illustrates installation of a system pulsation dampener in accordance with embodiments of the present disclosure.

As used herein, "system pulsation dampener" refers to a pulsation dampener installed between a standpipe manifold and a standpipe as illustrated by FIGS. 1 and 2; a combination standpipe manifold and pulsation dampener device as illustrated by FIG. 3; a pulse dampener manifold illustrated by FIG. 4; the orifice assembly pulsation dampening device (s) illustrated in FIGS. 5, 6 and 7; and the system pulsation control dampener located after the location at which outputs from multiple pumps are consolidated into one flow stream as shown in FIGS. 8 and 13.

FIG. 1 illustrates a diagrammatic view of a drilling system 100 including a pulsation dampener 102 installed between a standpipe manifold 104 and a standpipe 106 according to various embodiments of the present disclosure. The embodiment of the drilling system 100 illustrated in FIG. 1 is for illustration only. FIG. 1 does not limit the scope of this disclosure to any particular implementation of a drilling system.

Referring now to FIG. 1, the drilling system 100 includes at least one pulsation dampener 102, at least one standpipe manifold 104, at least one standpipe 106, at least one mud pump 108, at least one mud pit 110, at least one discharge line 112, a conventionally located pulsation dampener 113 at the outlet of the mud pump 108, and at least one drilling rig 114. The drilling system 100 operates to pump mud or other fluids down a well currently being drilled to keep a drill bit 128 from overheating, provide lubrication to the drill bit, and remove rock cuttings to the surface.

A fluid pump or mud pump 108 may pump fluid or mud from a mud pit 110 through a discharge line 112 in the direction of a drilling rig 114. More than one mud pump 108 can be utilized in a drilling system 100 to continue drilling upon the failure of a single mud pump 108. A pulsation dampener 102 can also be installed on the discharge line 112 for each mud pump 108 to further reduce pulsations. The mud pit 110 can also reference a fluid reservoir, where the fluid reservoir stores a fluid used during a drilling process.

Conventionally, a pulsation dampener 113 is located along the discharge line 112, at the outlet of the mud pump 108 and before the standpipe manifold 104. The standpipe manifold 104 may be installed down the discharge line 112 and is attached to and/or coupled in fluid communication with the drilling rig 114. The standpipe manifold 104 may receive a plurality of different fluid streams from a plurality of mud pumps 108. The standpipe manifold 104 may then combine all of the fluid streams together to send a single fluid stream up the standpipe 106. Other functions traditionally performed by the standpipe manifold are to provide an auxiliary connection for a supplementary pump and, in systems with multiple standpipes providing operational redundancy in case of failure of one standpipe, to switch fluid flow paths from one standpipe to another. However, those skilled in the art understand that some systems dispense with the standpipe manifold, and simply bring the outlet flows of multiple mud pumps together in a single line somewhere near the mud pumps or downstream, with the combined flow then traveling in a single line to the substructure and upwards toward the standpipe, When the fluid streams from multiple mud pumps are combined (in a standpipe manifold or without one), the pulsations in the resulting combined fluid flow can be enlarged based on the different pulsations of the mud pumps 108 being used. For example, the different types or sizes of mud pumps 108 can be used in a single drilling system 100, which would cause variations or pulsations in the fluid flow through the pipe. The mud pumps 108 could also be located at different distances from the standpipe manifold 104. The mud pumps 108 could begin at different times, operating off cycle from other mud pumps 108, or simply be operating at different stroke lengths. Any of the previous operating parameters would affect the flow of fluids or mud into the standpipe manifold 104 causing pulsations at the well.

The standpipe 106 may be installed on the drilling rig 114 and travel up the drilling rig 114 to provide the fluid stream through a rotary hose 116 connected to a swivel 118, the swivel 118 coupled to a rotary hook 120. The standpipe 106 receives discharge from the standpipe manifold, which includes the system pulsation dampener 102. The standpipe manifold 104 can include multiple discharges to the standpipe 106 in case of failure in part of the standpipe manifold 104 or associated pipeline.

The swivel 118 may serve as a passageway for the fluid stream into a Kelly drive 122 (or just "Kelly"). The Kelly 122 connects to a drill string 124. The fluid passes through the Kelly 122 and the drill string 124 down a bore hole 126 to a drill bit 128 disposed at a far end of the drill string 124. The Kelly 122 is typically rotated by a rotary table 130. More recent systems may include a top drive to rotate the drill string 124 as an alternative to the rotary table and Kelly drive, and the present disclosure is applicable to such top drive configurations as well.

In drilling systems, pulsation dampeners 113 can be installed near the mud pump 108 to reduce pump loads and minimize pulsation amplitudes from the mud pumps 108. However, as fluid is combined at the standpipe manifold 104 into a single stream and sent to the standpipe 106, significant energy and pulsation amplitudes may be created by the combining of the streams from the mud pumps 108 or transferred directly to the standpipe 106, which is then transferred to the rest of the system downstream described herein. The pulsation amplitudes produced may be greater as more mud pumps 108 are used to provide fluid reaching the standpipe manifold 104, as pulsations from multiple pipes receiving fluid from multiple mud pumps 108 come together and accumulate at the standpipe manifold, which are then transferred to the standpipe 106. These pulsations can cause wear and damage to components, including the connections near the swivel 118, Kelly 122, and other components such as a wash pipe and wash pipe packing (seals) (both not shown) that serves as a conduit for fluid through the swivel 118. Instruments used for monitoring and measuring operations while drilling can also be affected by the residual pulsations from the mud pump 108. Even the smallest pulsations from the standpipe manifold can affect the measurement readings.

An additional, system pulsation dampener 102 is thus installed between the standpipe manifold 104 and the standpipe 106 to reduce residual pulsations from the mud pump 108 and to reduce pulsations from combining of fluid streams at the standpipe manifold 104. System pulsation dampener 102 reduces the pulsations and, like the conventional pulsation dampener 113 and all other system pulsation dampener device(s) described herein, may produce an internal or external pressure drop within the passing fluid in order to further reduced higher frequency pulsations and enhance the overall dampening performance. In some embodiments, the system pulsation dampener 102 may be a gas charged dampener. The system pulsation dampener 102, like the conventional pulsation dampener 113 and all other system pulsation dampener device(s) described herein, may a hydro-pneumatic or gas-charged pressure vessel containing compressed air or nitrogen and a bladder (or bellows) that separates the process fluid from the gas charge. In some embodiments, the system pulsation dampener 102, like the conventional pulsation dampener 113 and all other system pulsation dampener device(s) described herein, may be a ball-type or cylindrical-type flow-through dampener. In some embodiments, reactive dampeners may be used that rely on compressibility of the process fluid contained within dampener enclosure and a resistance device fitted with or into the pulsation dampener to dampen pump pulsations.

The system pulsation dampener 102 may be installed to the standpipe manifold 104 via a hose connection. The system pulsation dampener 102 may have a flanged outlet connection, and a flange to hammer union adapter may be used to connect the pulsation dampener 102 to the standpipe manifold 104. The system pulsation dampener 102 may also connect to the standpipe 106 via a hosed connection.

The system pulsations dampener 102 installed before the standpipe 106 reduces both low and high frequency pulsation magnitudes to allow the wash pipe and packing, as well as other component, to last longer. In addition, the system pulsation dampener 102 reduces noise and pulsation levels to allow for easier signal detection by the Measurements While Drilling (MWD) and Logging While Drilling (LWD) contractor located on the drilling rig 114. The system pulsation dampener 102 also assists with reduced interference with downhole instruments that may pick up the residual pulsations and that skew detections and generated data from the downhole instruments.

FIG. 2 illustrates a diagrammatic view of a fluid delivery or drilling system 200 including a plurality of mud pumps 208 according to various embodiments of the present disclosure, which may be used in embodiments of a drilling system 100 that include a system pulsation dampener 102 installed between a standpipe manifold 104 and a standpipe 106 as depicted in FIG. 1. That is, except for replacement of the components in FIG. 1 with their counterparts, depicted in FIG. 2, the remainder of the drilling system for embodiments in accordance with FIG. 2 may conform to the additional structures depicted in FIG. 1. The embodiment of the drilling system 200 illustrated in FIG. 2 is for illustration only. FIG. 2 does not limit the scope of this disclosure to any particular implementation of a drilling system.

Referring now to FIG. 2, the drilling and/or fluid delivery system portion 200 for fluid delivery, drilling, or both that includes at least one system pulsation dampener 202, at least one standpipe manifold 204, at least one standpipe 206, and a plurality of mud pumps 208. The components of drilling system portion 200 can be used in place of the similar components of drilling system 100 illustrated in FIG. 1.

A system pulsation dampener 202 is installed between a standpipe manifold 204 and a standpipe 206. A plurality of mud pumps 208 may transfer fluid to a standpipe manifold 204 simultaneously, creating vibrations at the standpipe manifold 204. The pulsation dampener 202 may be installed in a similar manner as that described herein with respect to pulsation dampener 102, serving to alleviate pulsations generated by the plurality of mud pumps 208 as fluid enters and intersects within the standpipe manifold 204 and is combined into a single outlet stream.

FIG. 3 illustrates a diagrammatic view of a portion 300 of a system for fluid delivery, drilling, or both including a combination standpipe manifold and pulsation dampener device 302 according to various embodiments of the present disclosure, which may also be used in embodiments of a drilling system 100 that include a pulsation dampener 102 installed between the mud pump(s) and a standpipe as depicted in FIG. 1. That is, except for replacement of the components in FIG. 1 with their counterparts, depicted in FIG. 3, the remainder of the drilling system for embodiments in accordance with FIG. 3 may conform to the additional structures depicted in FIG. 1. The embodiment of the portion 300 of the drilling system illustrated in FIG. 3 is for illustration only. FIG. 3 does not limit the scope of this disclosure to any particular implementation of a drilling system.

Referring now to FIG. 3, the drilling and/or fluid delivery system portion 300 includes at least one combination standpipe manifold and pulsation dampener device 302, a plurality of mud pumps 304, at least one standpipe 306.

Standpipe manifolds may increase pulsations experienced by a drilling system due to standpipe manifolds typically having connections or piping that receives fluid from multiple directions from different mud pumps. Standpipe manifolds often have angled turns that each fluid stream must travel through before the standpipe manifold combines the disparate streams into a single stream. As the fluid enters the manifold and is transferred through the turns of the standpipe manifold, additional vibrations may be created.

The combination standpipe manifold and pulsation dampener device 302 can be used instead of a standpipe manifold. Instead of diverting the separate fluid streams into a single stream with hard turns, the fluids can be received and manipulated within the body of the combination standpipe manifold and pulsation dampener device 302. Pulsation dampeners often have a volume of space, or reservoir, within the dampener where a certain amount of fluid may accumulate and pulsations are reduced before moving out of the pulsation dampener. The combination standpipe manifold and pulsation dampener device 302 may receive separate fluid streams from a plurality of mud pumps 304. The combination standpipe manifold and pulsation dampener device 302 may have piping mounted on the exterior of surface of the combination standpipe manifold and pulsation dampener device 302. In the case of a ball-type or cylindrical-type pulsation dampener, the piping may be mounted at select place on the spherical or cylindrical body of the pulsation dampener. Fluid received by the combination standpipe manifold and pulsation dampener device 302 may be deposited into the interior volume of the combination standpipe manifold and pulsation dampener device 302 and fluid within the interior volume of the combination standpipe manifold and pulsation dampener device 302 would exit the combination standpipe manifold and pulsation dampener device 302 to travel to the standpipe 306. The combination standpipe manifold and pulsation dampener device 302 can align the different received fluids to control the pulsations to be reduced in the combination, such as by creating a rotation within a chamber.

Since the combination standpipe manifold and pulsation dampener device 302 includes an interior volume, the problems of using a standpipe manifold can be avoided. The combination standpipe manifold and pulsation dampener device 302 does not have turns like a standpipe manifold, reducing the vibrations created as the separate streams intersect, and the combination standpipe manifold and pulsation dampener device 302 also provides pulsation dampening effects as it receives the separate fluid streams. The separate fluid streams can thus be combined within the volume of the combination standpipe manifold and pulsation dampener device 302 and then the single combined stream may exit the combination standpipe manifold and system pulsation dampener device 302 to travel to the standpipe 306 with a reduced or minimal energy being transferred to the standpipe 306 and to the rest of the downstream components.

FIG. 4 illustrates a combination standpipe manifold and pulsation dampener device 400 according to various embodiments of the present disclosure, which may be used in embodiments of a drilling system 100 that include a pulsation dampener 102 installed between the mud pump(s) and a standpipe as depicted in FIGS. 1 through 3 or in embodiments of a drilling system 100 that include a pulsation dampener 302 installed after fittings combining multiple fluid flow streams as depicted in FIG. 8. The embodiment of the combination standpipe manifold and pulsation dampener device 400 illustrated in FIG. 4 is for illustration only. FIG. 4 does not limit the scope of this disclosure to any particular implementation of a pulsation dampener or pulsation dampening method.

Referring now to FIG. 4, the combination standpipe manifold and pulsation dampener device 400 may be used in the systems 100, 200, and 300 described herein. The pulse dampener manifold includes a body 402. The body 402 illustrated in FIG. 4 is a spherical or cylindrical body according to various pulse dampeners having a ball-type or cylindrical-type body. However, different body shapes may be used to allow for different pulsation dampener body shapes, such as that shown in FIGS. 1-3.

The pulsation dampener manifold 400 may also include a reservoir 404 within an interior of the body 402. The reservoir 404 may collect a volume of fluid 406 from mud or fluid pumps residing upstream, through a plurality of upstream connections 408, in a fluid delivery or drilling system, such as those described with respect to FIGS. 1-3. The fluid received from each of the upstream connections 408 are combined as the volume of fluid 406. At least a portion of the volume of fluid 406 may then exit the pulse dampener manifold 400 as single fluid stream through a downstream connection 410. The combination standpipe manifold and pulsation dampener device 400 thus may fully replace a standpipe manifold, reducing the vibrations created from multiple fluid streams traveling through a standpipe manifold, and providing pulsation dampening for all streams entering the combination standpipe manifold and pulsation dampener device 400.

FIG. 5 is a diagrammatic view of a drilling system including an alternative system pulsation dampener mechanism(s) that may be installed in, proximate to, or downstream of a standpipe according to various embodiments of the present disclosure. The embodiment of the drilling system 500 illustrated in FIG. 5 is for illustration only. FIG. 5 does not limit the scope of this disclosure to any particular implementation of a drilling system. Although FIG. 5 does not depict a conventional pulsation dampener located at the output of the mud pump(s) or a system pulsation dampener between the standpipe manifold and the standpipe, those skilled in the art will recognize that one or more of the system pulsation dampener(s) diagrammatically depicted in FIG. 5 may be used either without such pulsation dampeners, with either of the conventional or system pulsation dampeners described above, or with both such conventional and system pulsation dampeners.

In the system of FIG. 5, pulsation dampening is either provided or enhanced by one of several different types of orifice designs positioned at one or multiple locations in or near the standpipe 506 or in the fluid flow path after the standpipe. The one or more orifice assemblies 502a, 502b, 502c, 502d, ..., 502n that each comprises system pulsation dampening device(s) may be located at different points within the fluid flow path. The pulsation dampening orifice assembly may be located within or connected to the entry pipe for the top drive or swivel (depending on the type used by any given rig) as illustrated by orifice assembly 502a. The pulsation dampening orifice assembly may be located in between the hose 516 and the end of the entry pipe for the top drive or swivel as illustrated by orifice assembly 502b. The pulsation dampening orifice assembly may be located at a point just past the standpipe 506, in between the end of the standpipe 506 and the beginning of the hose 516 that connects the standpipe 506 to the top drive or swivel (depending on the type used by any given rig) as illustrated by orifice assembly 502c. Alternatively, the pulsation dampening orifice assembly may be located further along the hose/piping system, as illustrated by orifice assembly 502d. In still another alternative, the pulsation dampening orifice assembly may be located in the standpipe 506 located on the side of the derrick, possibly at or near one end of the standpipe 506 (although it may be positioned anywhere along the length of the standpipe 506), as illustrated by orifice assembly 502n. A single pulsation dampening orifice assembly may be employed, or multiple pulsation dampening orifice assemblies may be used at different locations along the fluid flow path, including one in each of the locations depicted in FIG. 5 or multiple pulsation dampening orifice assemblies within the top drive or swivel entry pipe (in the region of orifice assembly 502a), between the hose and the top drive or swivel entry pipe (in the region of orifice assembly 502b), between the standpipe 506 and the hose 516 (in the region of orifice assembly 502c), multiple pulsation dampening orifice assemblies in the hose 516 (in the region of orifice assembly 502d), and/or multiple pulsation dampening orifice assemblies in the standpipe 506 (in the region of orifice assembly 502n). Those skilled in the art will recognize that various permutations of the number and location of pulsation dampening orifice assemblies may be suited to different applications. Pulsation dampening orifice assemblies may also be positioned at other locations than those shown in FIG. 5, such as at the end (outlet) of the standpipe or at the connection to the swivel or top drive for the hose connected to the standpipe. As noted above, each pulsation dampening orifice assembly may produce an internal or external pressure drop in fluid passed, to enhance dampening of higher frequency pulsations. These orifice assemblies may or may not include liquid volumes to further enhance performance.

Figure 10A:
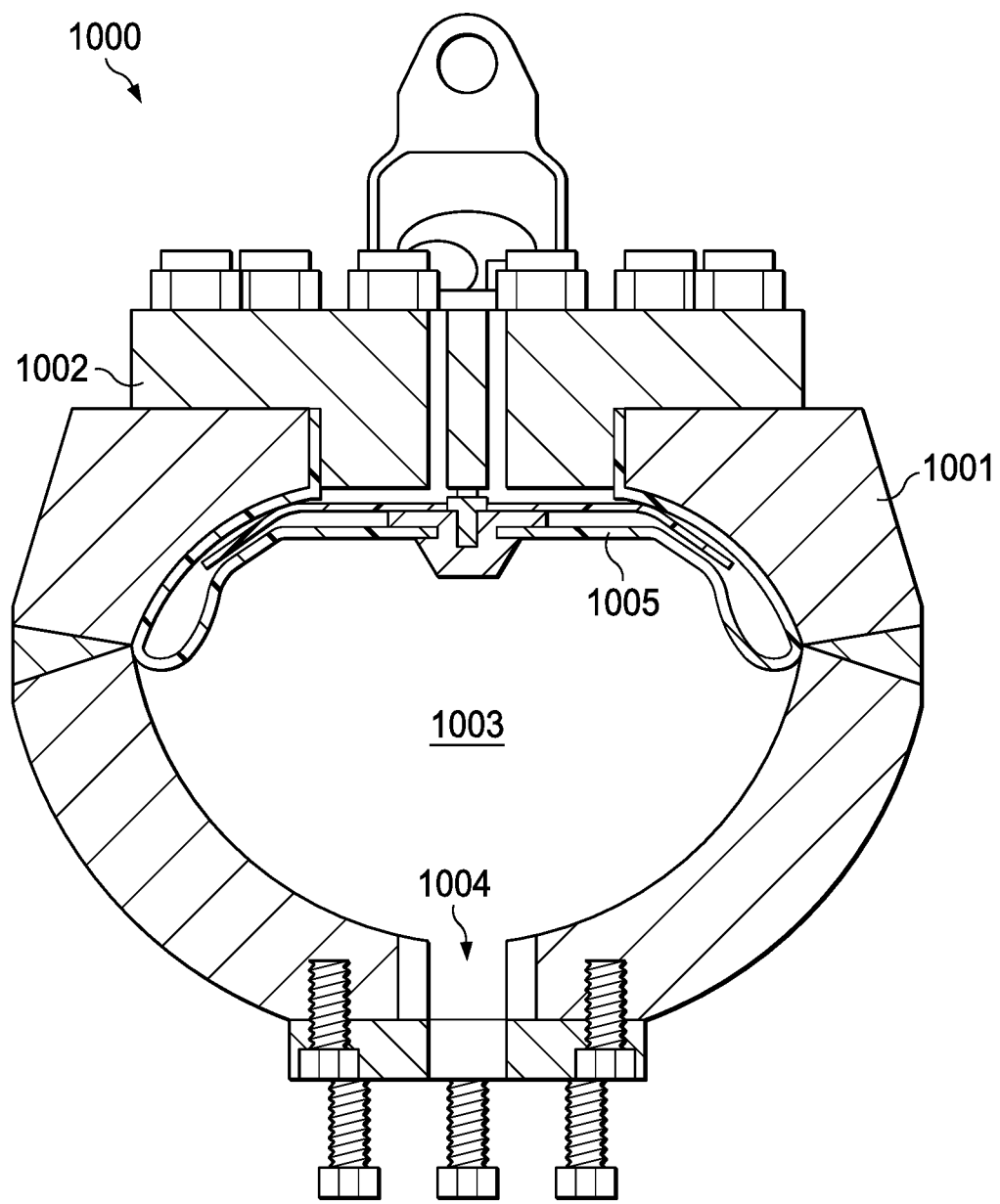
FIGS. 10A through 10C depict a gas-charged pulsation dampener.
Figure 10B:
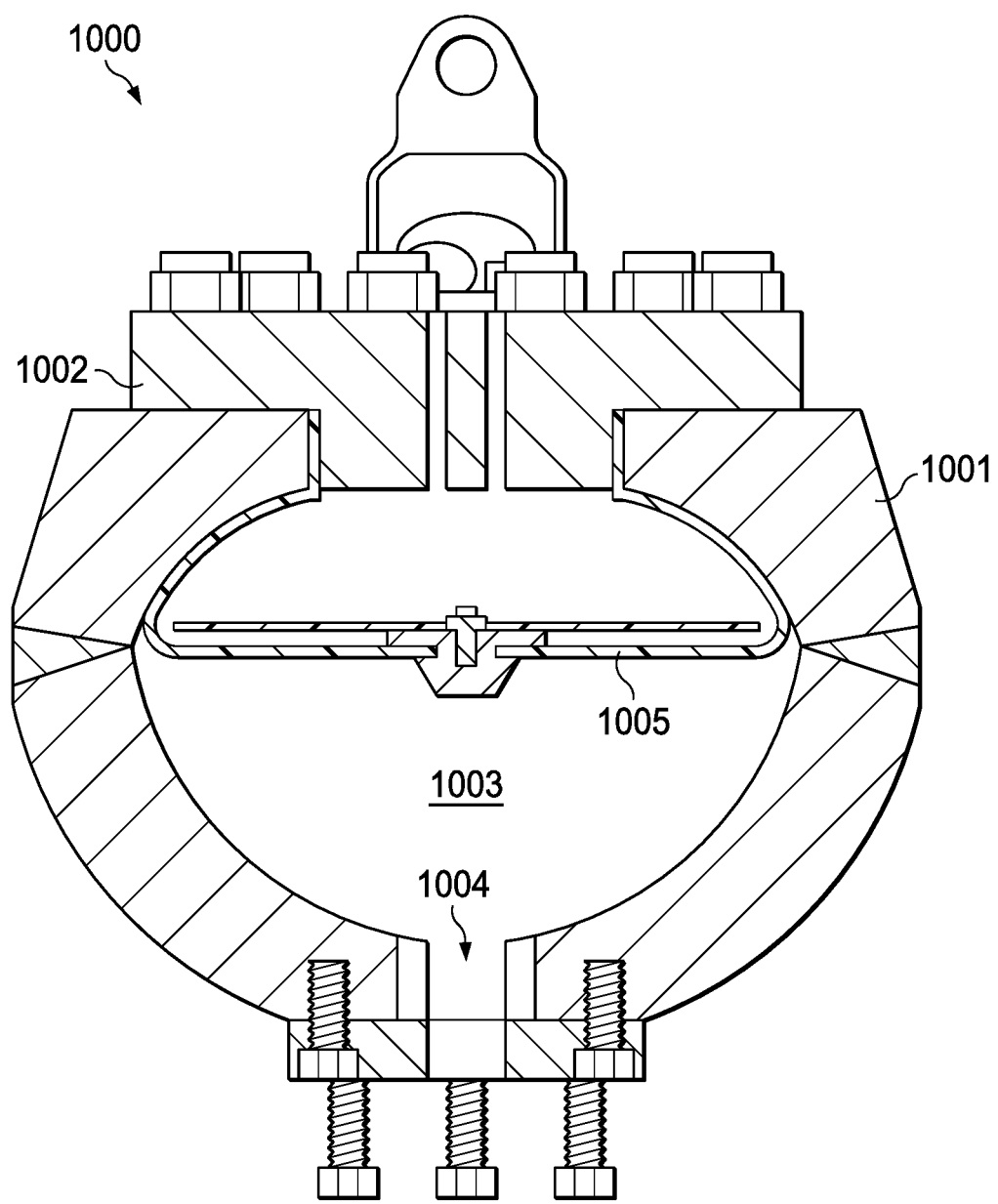
Figure 10C:
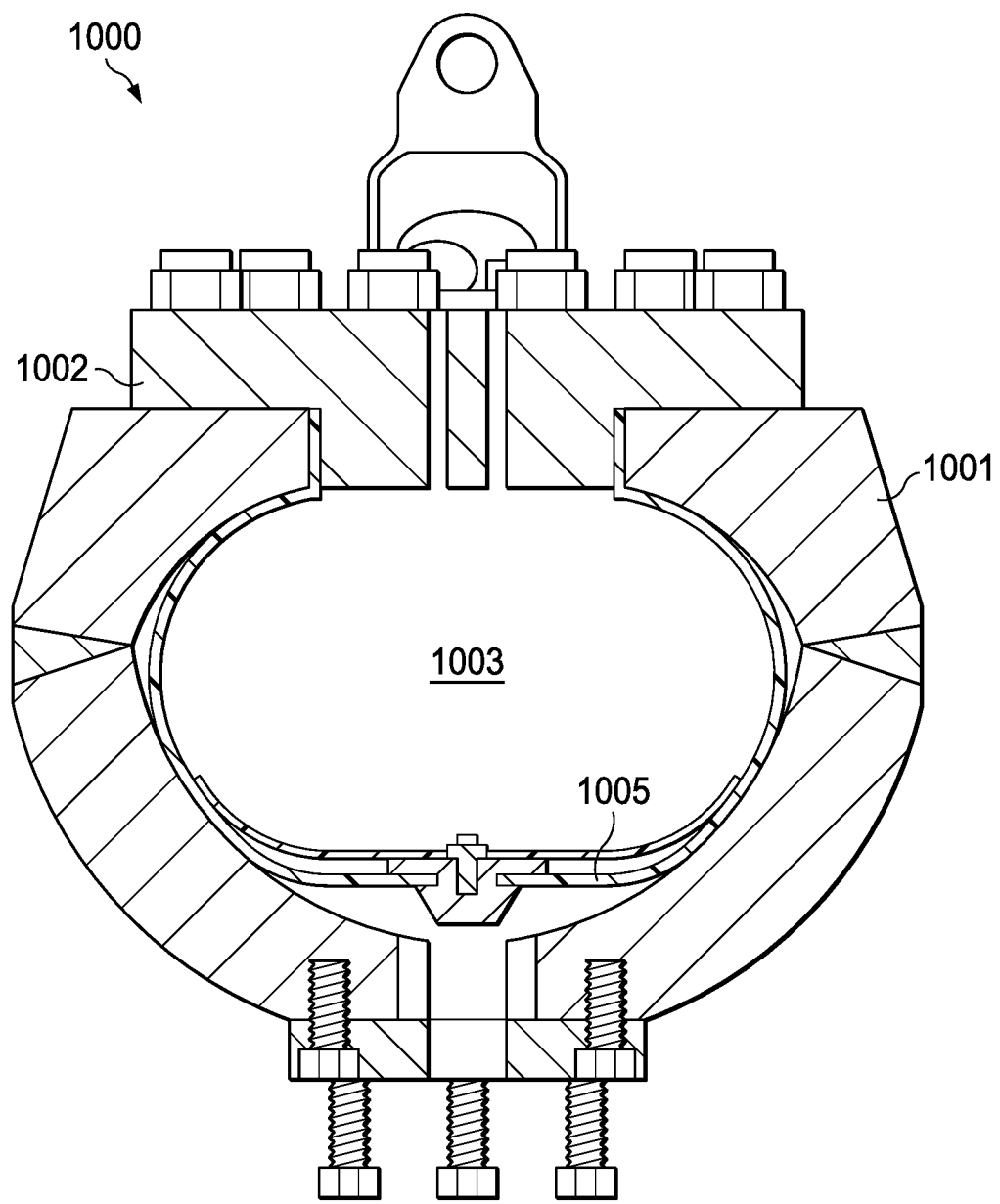

In one advantageous embodiment, the system pulsation dampener obviates the need to recharge a gas-charged pulsation dampener or replace the compression material within commercially available, charge-free pulsation dampeners. The system 500 retains at least the housing 1001 and cover 1002 of a gas-charged pulsation dampener 501 of the type depicted in FIGS. 10A through 10C. Notably, gas-charged pulsation dampeners typically are positioned above the piping through which pumped fluid passes using a cross, although not shown that way for system pulsation dampener 501 in FIG. 5. Cross-sections of a gas-charged pulsation dampener are depicted in FIGS. 10A through 10C. As depicted in FIG. 10A, the gas-charged pulsation dampener 1000 includes a housing body 1001 having an upper opening receiving and sealed by a cover 1002, which combine to form an internal cavity 1003 connected to pump system fluid piping (not shown) via a lower opening 1004. A flexible internal bladder 1005 within the internal cavity 1003 is filled with a compressible gas. Fluid from the connected piping enters and/or leaves the cavity 1003 via the lower opening 1004. The pressure of that fluid and the pressure of the compressible gas within the bladder 1005 will cause the lower surface of the bladder 1005, which is in contact with the pump system fluid, to shift and the volume occupied by the gas within the bladder 1005 to change. High pump fluid pressure will cause the bladder 1005 and the gas therein to be substantially compressed into a smaller volume, while mid-range pressure, or transition from high pressure to low pressure, will cause the bladder and its gas to expand into a larger volume and low fluid pressure will allow the bladder 1005 and its gas to expand essentially to a maximum volume allowed by the internal cavity 1003 of the housing body 1001 and cover 1002. The compressed gas within the bladder 1005 thus acts to absorb pressure pulses within the pump fluid and reduce the peak pressure that may occur. However, the compressed gas must be periodically (e.g., monthly, bi-monthly, quarterly or semi-annually) recharged. Referring back to FIG. 5, instead of re-charging the bladder 1005, the bladder 1005 is simply removed. One or more system pulsation dampener(s) are installed at the location(s) and in the manner discussed above, obviating the need for the gas-charged pulsation dampener 501 and further maintenance thereof. In many if not most instances, pulsation dampening performance can be improved by that substitution.

Figure 11A:
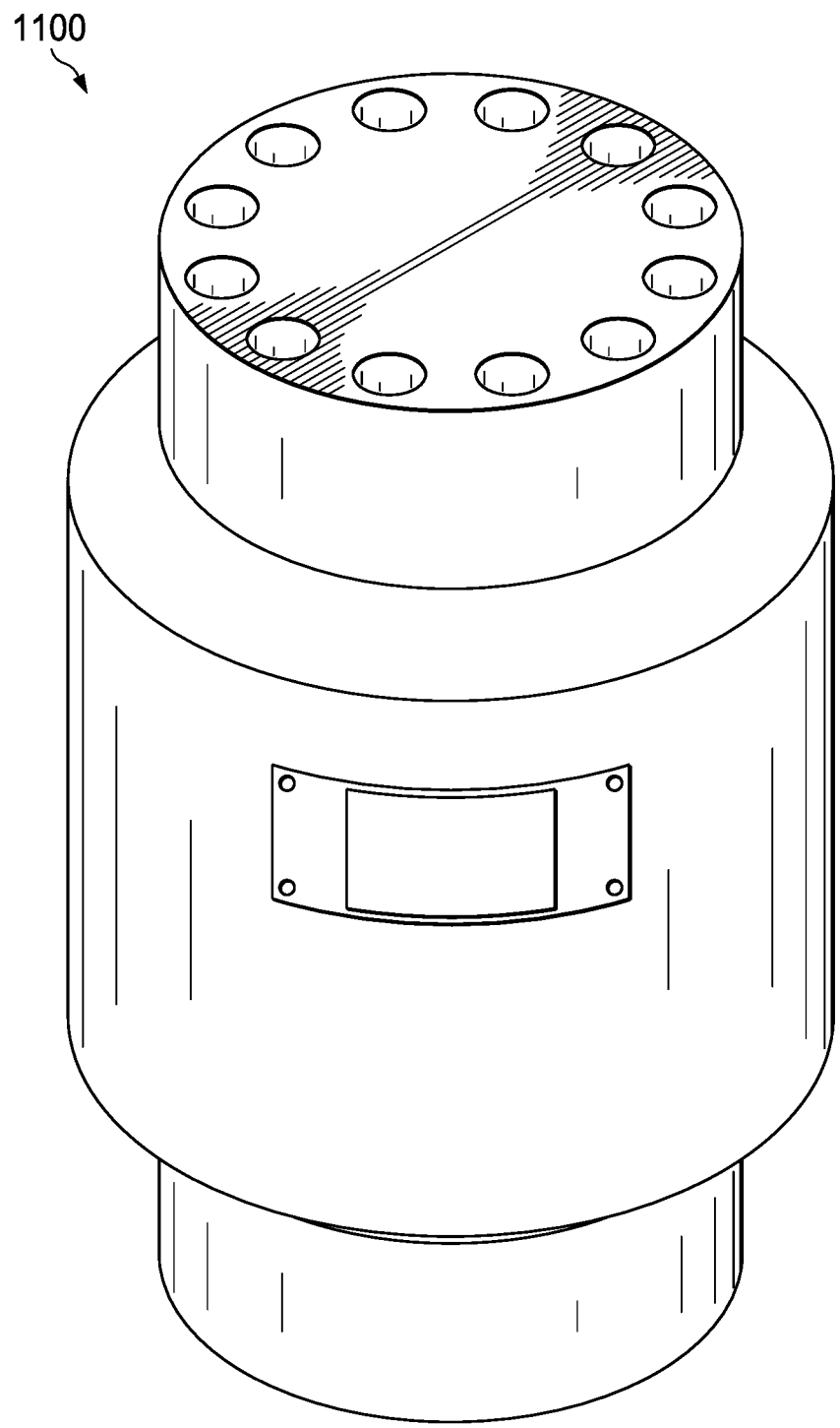
FIGS. 11A and 11B depict components of a commercially-available charge-free pulsation dampener.
Figure 11B:
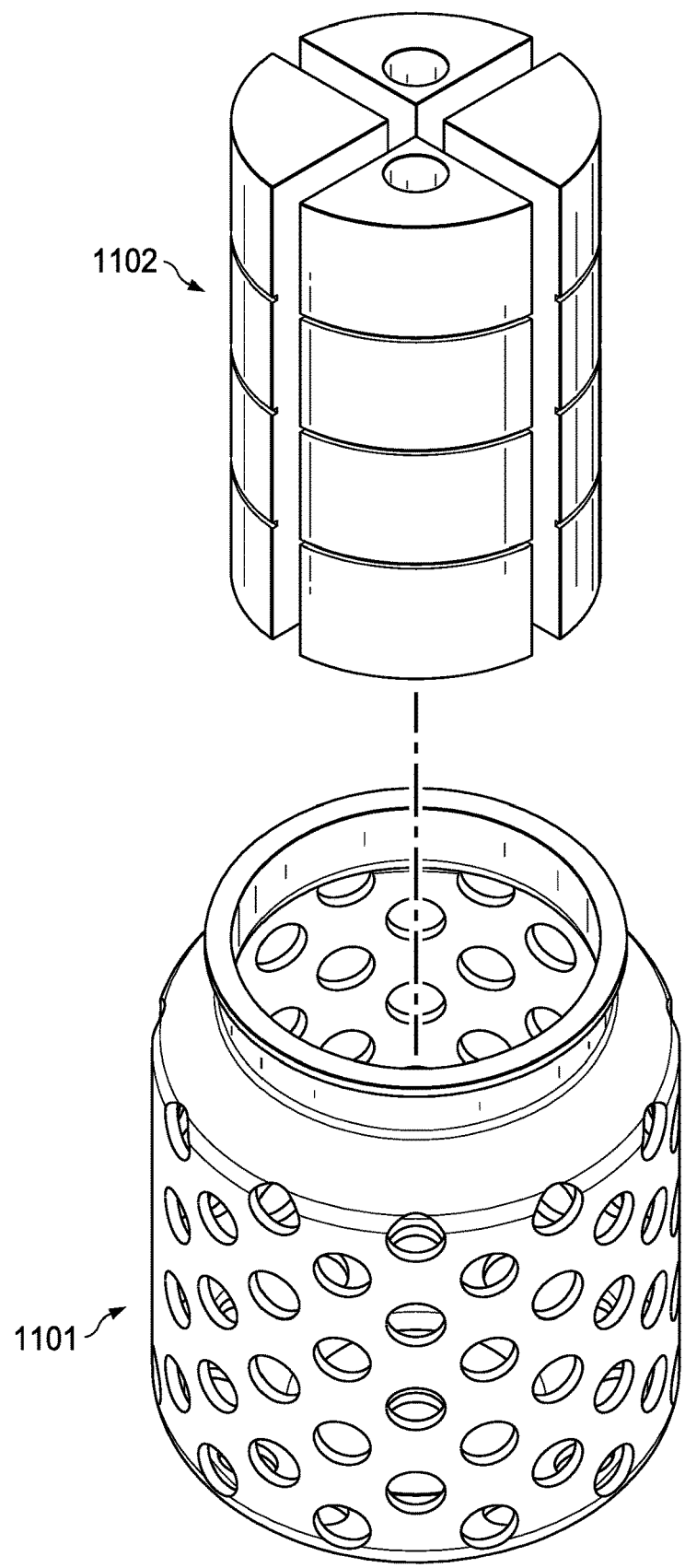

Alternatively, the system 500 retains at least the housing 1001 of the commercially-available, charge-free pulsation dampener 501 of the type depicted in FIGS. 11A and 11B. Again, charge-free pulsation dampeners typically are positioned above the flow line through which pumped fluid passes, although not shown that way for system pulsation dampener 501 in FIG. 5. Charge-free pulsation dampeners are often not as effective at attenuating pressure pulsations as gas-charged pulsation dampeners. The components for commercially available charge-free pulsation dampeners are depicted in FIGS. 11A and 11B. The pulsation dampener depicted in FIGS. 11A and 11B does not use a gas-charged bladder. As depicted in FIG. 11A, the charge-free pulsation dampener includes a housing 1100. The housing has a removable top portion with inlets and outlets for fluid passage into and out of the housing. A cage 1101 depicted (twice) in FIG. 11B is suspended within the housing and has an upper lip that is sealed against an interior of the housing 1100. The cage 1101 includes an open top together with openings through the sidewall and bottom surfaces thereof (hence forming a "cage" or basket). The cage 1101 holds compression material 1102 within an interior of the cage. The compression material in the example shown comprises a layered system of compression disks each segmented into four quarter-round wedges. As fluid enters the pulsation dampener housing 1100 and passes through the open top and/or the openings in the sidewall and bottom surface of the cage 1101, the fluid is distributed through the compression material with the pump system operating pressure applied across the various surfaces of the compression material, causing the compression material to compress under pressure and thereby attenuate pressure spikes.

Although charge-free (that is, not requiring recharge of a gas medium as is necessary with of gas-filled bladders), the pulsation dampener of FIGS. 11A and 11B is not maintenance free. After some time in operation (e.g., 12 months), the compression material 1102 may become clogged with and/or deformed by mud and will typically require replacement due to lose of elasticity and/or accumulation of particulate matter within the pulsation dampener, necessitating shut-down of the pump system. In addition, the compression material(s) are typically fabricated and selected for operation within a specified or pre-determined pressure range. Changes to the nominal system operating pressure, whether intentional or resulting from a change in operating conditions, can necessitate change of the compression material, likewise requiring that the pump system be shut down. Referring back to FIG. 5, when maintenance of the commercially-available, charge-free pulsation dampener 501 becomes necessary, instead of replacing the compression material 1102, the seal can be replaced with a gasket and the compression material 1102 (and optionally also the cage 1101) is simply removed. One or more true maintenance-free system pulsation dampener(s) are installed at the location(s) and in the manner discussed above, obviating the need for the commercially-available, charge-free pulsation dampener 501 and further maintenance thereof. In many if not most instances, pulsation dampening performance can be improved by that substitution.

FIGS. 6A through 6E are side sectional and cross sectional views, respectively, of a pulsation dampening orifice assembly 502x that may be used as any one of orifice assemblies 502a, 502b, 502c, 502d, and/or 502n to implement one or more system pulsation dampening device(s). As illustrated in FIG. 6A, one exemplary pulsation dampening orifice assembly 502x includes a small enlarged volume, which may be formed (for example) by inserting a pipe segment 622 having a larger inner diameter (as little as 1-2 inches larger) that the pipe for the fluid flow path before and after the pulsation dampening orifice assembly. At the end of the enlarged volume is a fluid flow resistance or pressure drop feature such as an orifice plate or a drop tube. In the example depicted in FIGS. 6A and 6B, an orifice plate 624 or 626 (see FIG. 6E) is provided. However, those skilled in the art will recognize that a drop tube may be used instead. In accordance with the known art, the aggregate area of the openings through the orifice plate 624 or 626 is selected, in combination with the enlarged volume, to dampen pulsations within the fluid flow through the standpipe 506 and hose 516. As shown in FIG. 6C, the orifice plate 624 or 626 may be located at the opposite end (relative to the direction of fluid flow) of the enlarged volume formed by the pipe segment 622. Alternatively, the orifice plate 624 or 626 may be located in the middle of the enlarged volume, or anywhere in between. Multiple orifice plates may be disposed within a single enlarged volume. As illustrated in FIG. 6D, in a simple form, the pulsation dampening orifice assembly 502x simply comprises an orifice plate 624 or 626 without any fluid-flow resistance produced by an adjoining or surrounding enlarged volume of the fluid flow path. As illustrated in FIG. 6D, the orifice plate 624 may have a plurality of orifices. As illustrated in FIG. 6E, the pulsation dampening orifice assembly 502x may comprise an orifice plate 626 with a single orifice. As noted above, orifice assemblies may or may not include liquid volumes to further enhance performance. FIGS. 6A and 6C show an expanded segment 622 within which a liquid volume may be contained.

FIG. 7 is a diagrammatic view of an alternate design, with redundancy, for system pulsation dampener device(s) that may be installed in, proximate to, or downstream of a standpipe according to various embodiments of the present disclosure to implement the pulsation dampening orifice assembly portion(s) of FIG. 5. In the embodiment of FIG. 7, a pulsation dampening orifice assembly 502x includes a first assembly 701 and a second assembly 702 each including an enlarged volume and orifice plate, which are provided within each of two parallel fluid flow paths with control valves 703, 704, 705 and 706 (manually controlled, or under automated control) controlling which of the two flow paths is being used. This design provides redundancy in case of failure of a pulsation dampening orifice assembly, and in some high flow applications may be used as a low flow device.

FIG. 8 illustrates a diagrammatic view of a fluid delivery or drilling system 800 including fittings combining multiple fluid flow streams according to various embodiments of the present disclosure, which may also be used in embodiments of a drilling system 100 that include a pulsation dampener 102 installed after the fittings combining multiple fluid flow streams. The embodiment of the drilling system 800 illustrated in FIG. 8 is for illustration only. FIG. 8 does not limit the scope of this disclosure to any particular implementation of a drilling system.

There is not always a standpipe manifold within the fluid flow streams of a drilling rig. Some rigs bring the various mud pump discharge fluid streams together by simple fittings that join multiple fluid streams together into one stream. Referring now to FIG. 8, the drilling system 800 includes at least one fitting 802 and/or 804, a plurality of mud pumps 304, and piping 806 receiving the combined fluid flow streams.

The system pulsation dampener device 102, 202, 302, 402 or 502x (system pulsation dampener device 302 depicted in FIG. 6) can be used within piping 806 after the fittings 802 and/or 804. Pulsation dampeners such as system pulsation dampener device 102, 202, 302, 402 or 502x often have a volume of space, or reservoir, within the dampener where a certain amount of fluid may accumulate and pulsations are reduced before moving out of the pulsation dampener. The system pulsation dampener device 102, 202, 302, 402 or 502x may receive the combined mud pump discharge fluid streams. The fluid received by the system pulsation dampener device 102, 202, 302, 402 or 502x may be deposited into the interior volume of the pulsation dampener 102 or 202, combination standpipe manifold and pulsation dampener device 302, a pulsation dampener manifold 400, or orifice assembly pulsation dampener device(s) 502x. Fluid within the interior volume of the system pulsation dampener device would exit the system pulsation dampener device to travel to the drilling rig 114 via piping 806. The system pulsation dampener device can control the pulsations to be reduced in the combination, such as by creating a rotation within a chamber.

Since the system pulsation dampener device includes an interior volume, the problems of using a standpipe manifold can be avoided. The system pulsation dampener device does not have turns like a standpipe manifold, reducing the vibrations created as the separate streams intersect, and the system pulsation dampener device also provides pulsation dampening effects as it receives the combined fluid streams. The combined fluid streams may thus exit the system pulsation dampener device to travel to the drilling rig 114 with reduced or minimal energy being transferred to the rest of the downstream components.

Figure 9:
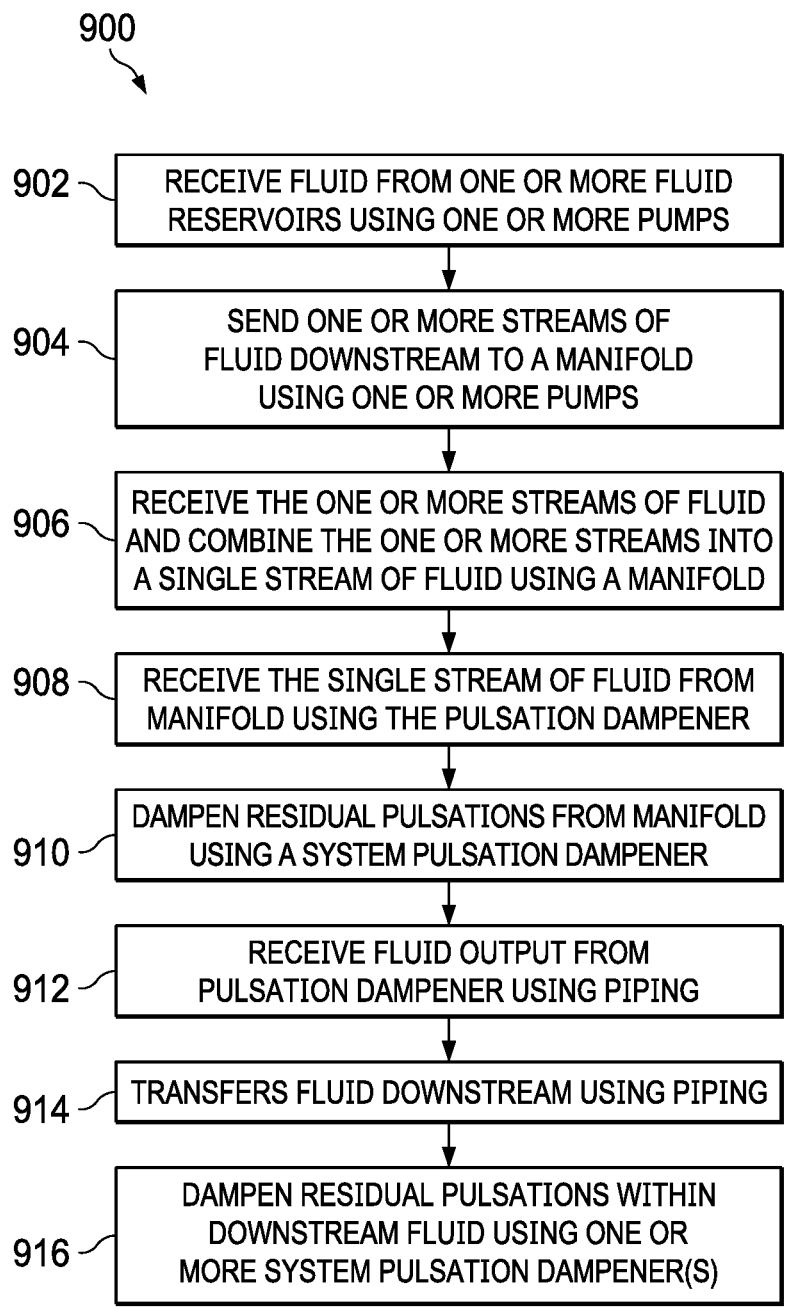
FIG. 9 is a high level flowchart of a fluid delivery and pulsation dampening process of a fluid delivery system according to various embodiments of the present disclosure.

FIG. 9 illustrates a flowchart of a fluid delivery and pulsation dampening process 900 of a fluid delivery system 100 or 500 according to various embodiments of the present disclosure. For example, the process 900 of FIG. 9 may be performed by a system 100 illustrated in FIG. 1 or a system 500 illustrated in FIG. 5, or those systems as modified according to FIG. 2, 3 or 4 (without, as appropriate, the steps relating to a manifold).

Referring now to FIG. 9, the process begins at step 902. At step 902, one or more pumps receive fluid from one or more fluid reservoirs, such as the mud pit 110 described herein. At step 904, the one or more fluid pumps send one or more streams of fluid downstream through the fluid delivery system. At step 906, a manifold receives the one or more streams of fluid and combines the one or more streams of fluid into a single stream of fluid. At step 908, the pulsation dampener receives the single stream of fluid from the manifold.

At step 910, the installed system pulsation dampener dampens the residual pulsations produced by the manifold. In some embodiments, the system pulsation dampener may perform the dampening operations when the one or more streams are received at the pulsation dampener, such as if the pulsation dampener is a combination standpipe manifold and pulsation dampener device replacing a standpipe manifold in the fluid delivery system. At step 912, piping receives fluid output from the system pulsation dampener. The piping may in some embodiments be a standpipe, such as the standpipe 106. At step 914, the piping transfers the fluid downstream. At step 916, one or more additional installed system pulsation dampener(s) dampen any residual pulsations within the fluid flow.

Figure 12A:
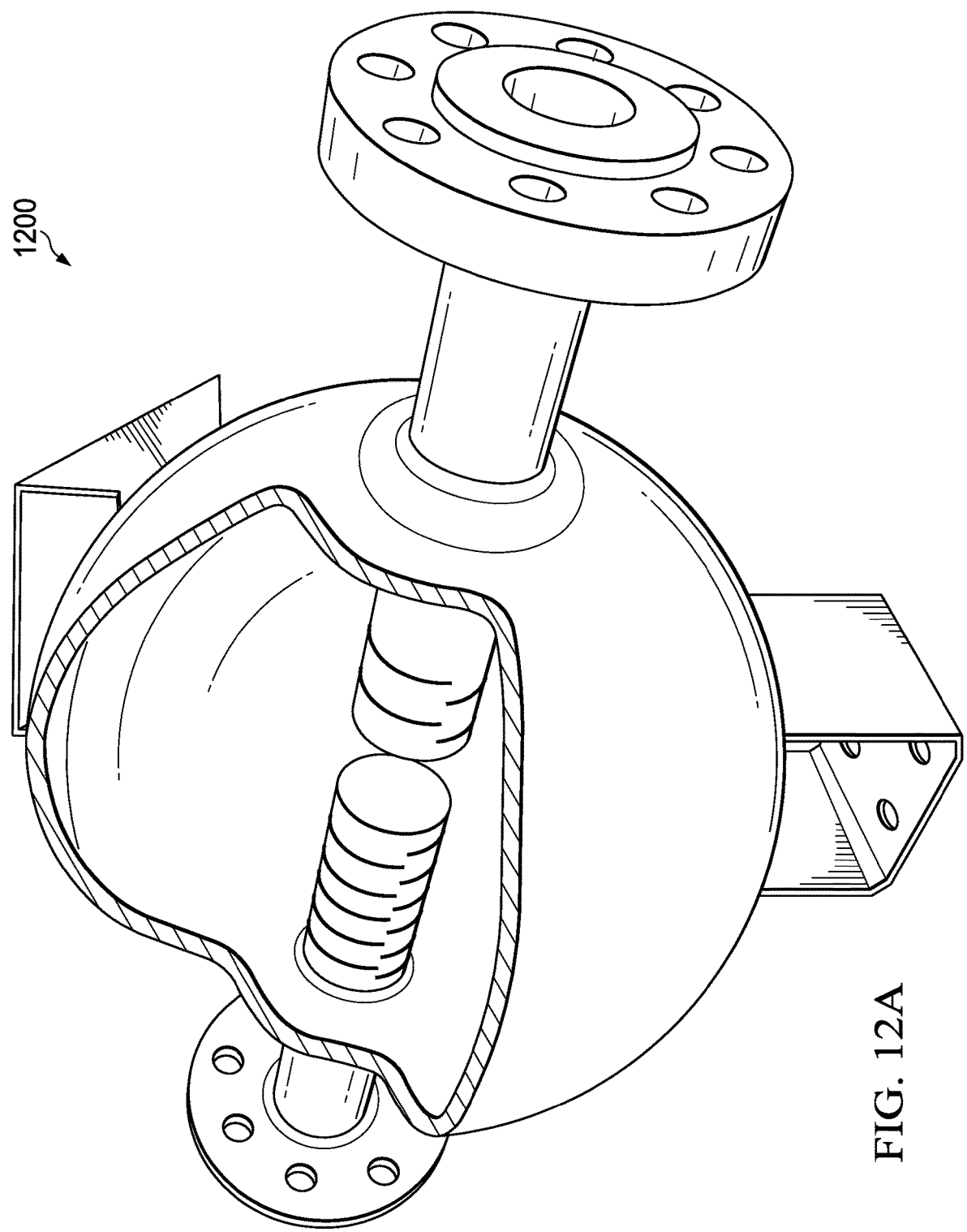
FIGS. 12A and 12B are cutaway and diagrammatic illustrations, respectively, of a maintenance free, reactive system pulsation dampener in accordance with embodiments of the present disclosure.
Figure 12B:
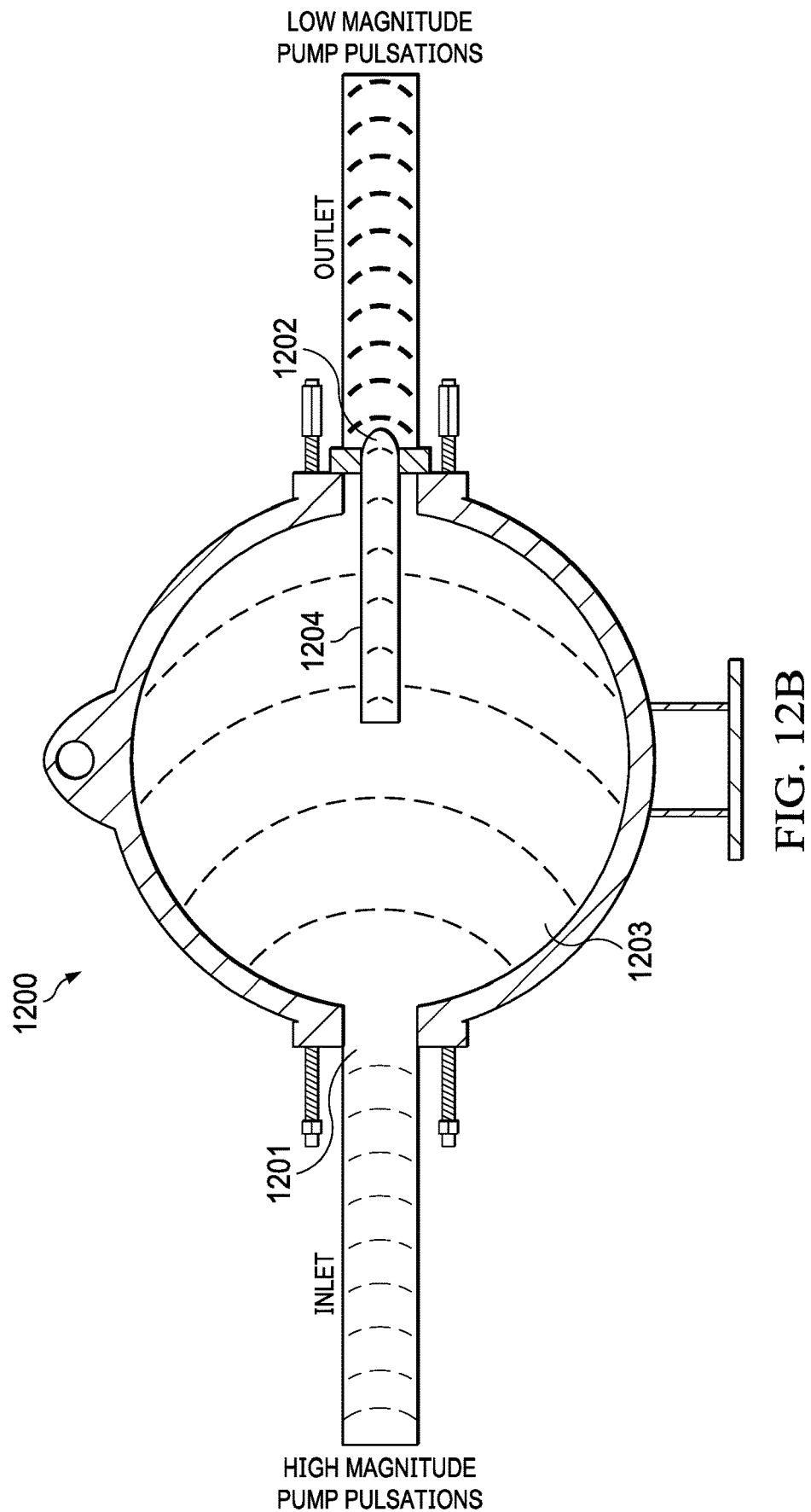

FIGS. 12A and 12B are cutaway and diagrammatic illustrations, respectively, of a maintenance free, reactive system pulsation dampener in accordance with embodiments of the present disclosure. Only a few, long-wear and simple components are utilized, enabling easy refurbishment and long duty cycles without adjustment. Gas-charging (i.e., bladder and valves/gauges) or use of compression materials are eliminated, such that maintenance is minimal (e.g., periodic inspection), with no cover removal required. The maintenance free, reactive system pulsation dampener 1200 has no moving parts, using the pumped fluid for pulsation dampening. Fluid 1201 with high magnitude pump pulsations is received via the inlet and fluid 1202 with low magnitude pump pulsations is discharged via the outlet, with fluid 1203 within the body reactively dampening the pump pulsation magnitude—that is, the pumped media reacts with the system fluid mass for pulsation reduction. An optional, removable pressure drop assembly 1204 may contribute to attenuation of pump fluid pressure pulsations.

FIG. 13 illustrates installation of a system pulsation dampener in accordance with embodiments of the present disclosure. In the example illustrated, two three-cylinder pumps having connected outputs each include a suction stabilizer 1301 connected to the inlet and a gas-charged (or charge-free) pulsation dampener 1302 at the outlet. In such configurations, space and support are key and in/out flow-through piping is required. For such appendage-mounted gas units 1301, 1302, pump skids and piping must be modified and space within the pump room is required. The space and cost of such requirements may be eliminated by using a single, suitably installed system pulsation dampener 501.

To retrofit the system of FIG. 13, any gas cartridges within the vessels of the suction stabilizers 1301 are removed and (optionally) replaced with an enhanced cellular tube for charge-free operation, with no piping changes necessary. Similarly, any gas-charged bladders within the appendage-mounted gas dampeners 1302 are removed and the vessels allowed to fill with fluid during operation, to provide initial dampening control (again, with no piping changes). Optionally, orifice plates or similar devices may be installed within the flow path after the vessels of the existing appendage-mounted gas dampeners 1302. A stand-alone reactive system pulsation dampener 501 is added into the pump system discharge line, connected using a simple connection using high-pressure discharge connectors, to remove lingering pulsations. The system pulsation dampener 501 is sized through design analysis and located downstream of the pumps and legacy dampening equipment. The system pulsation dampener 501 is preferably located where pressure pulsations are accumulated (e.g., within a network flow after the individual pump outputs are aggregated), and preferably as close to the pump(s) as possible.

Figure 14A:
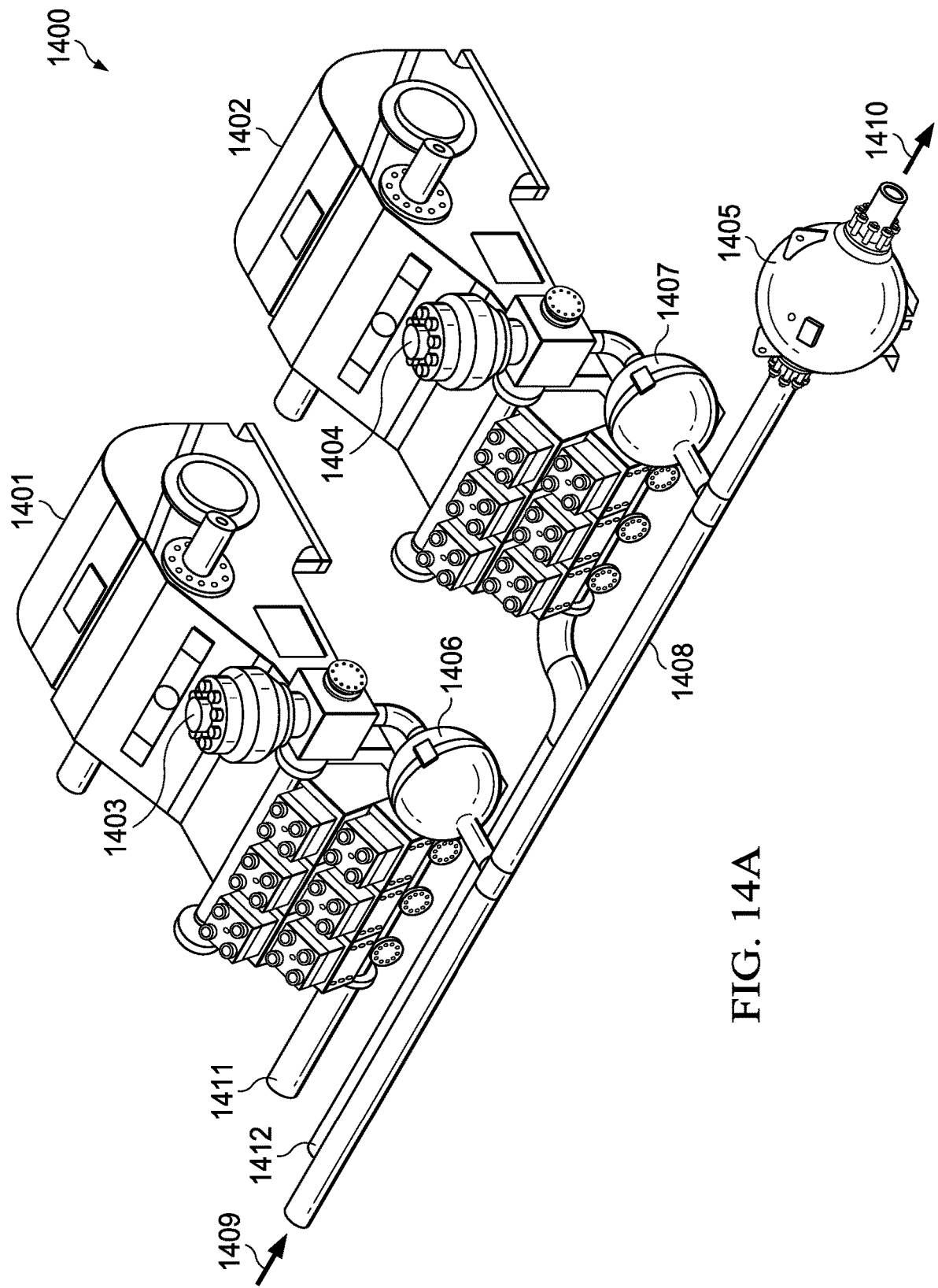
FIGS. 14A through 14D depict embodiments of a piping network within which a system pulsation dampener and two or more "mini" outlet pulsation dampeners are installed in accordance with embodiments of the present disclosure.

FIGS. 14A through 14D depict embodiments of a piping network within which a system pulsation dampener and two or more mini outlet pulsation dampeners are installed in accordance with embodiments of the present disclosure. As depicted in FIG. 14A, a portion of a pump system 1400 includes at least two pumps 1401 and 1402 each pumping fluids, and optionally additional pumps (not shown). Pump system 1400 may be described as a "multi-pump" system in that the fluid streams from pumps 1401 and 1402 are combined at some point downstream from at least one of the two pumps to form a single fluid stream within piping, other pumps or functional fluid handling components (e.g., strainer or standpipe manifold), and/or pulsation dampeners, as distinct from pump installations that merely accumulate separate fluid flows from multiple pumps within a storage tank or the like.

Consistent with the embodiment described in connection with FIGS. 11A-11B, 12A-12B and 13, the use of a system pulsation dampener and two or more mini outlet pulsation dampeners ("mini-dampeners") may optionally be employed to retrofit a pump system having existing appendage pulsation dampeners requiring regular or sporadic maintenance. The pumps 1401 and 1402 may optionally be equipped at outlets thereof with ephemeral pulsation dampeners 1403 and 1404, respectively, typically of types utilizing appendage rather than flow-through attachment to a fluid flow stream. Pulsation dampeners 1403 and 1404 are "ephemeral" in that each requires periodic or sporadic maintenance over the lifetime of the pump system 1400 within which pumps 1401 and 1402 are installed. That is, the maintenance-free operating cycle of the ephemeral pulsation dampeners 1403 and 1404 is shorter than the expected operating period for the pump system 1400. For example, gas charged pulsation dampeners must be periodically recharged, and charge-free, compression material pulsation dampeners normally require sporadic or intermittent replacement of the compression material therein due to accumulation of particulate matter, deformation, and/or degradation in elasticity (and therefore of pulsation dampening performance). As described above, pump system 1400 may be retrofitted by simply removing portions of the ephemeral pulsation dampeners 1403 and 1404 (the bladder in a gas-charged pulsation dampener or the compression material in a charge-free design) and leaving the vessel (body or housing) of the pulsation dampener to fill with liquid. Modeling of the fluid behavior for the pump system 1400 may take into account the modified ephemeral pulsation dampeners 1403 and 1404.

More generally, and independent of any need to retrofit a pump system including existing pulsation dampeners, pulsation dampening performance in multi-pump pump system 1400 may be improved by use of a system pulsation dampener 1405 (which may be positioned off the pump skid) and a plurality of mini pulsation dampeners 1406 and 1407. As shown in the example of FIG. 14A, mini-dampener 1406 is coupled between the outlet of pump 1401 and a header pipe 1408, while mini-dampener 1407 is coupled between the outlet of pump 1407 and the header pipe 1408. In certain embodiments, a length of the at least one header pipe between an output of a first mini-dampener and an output of a second mini-dampener is based on an operational pumping pressure. The header pipe 1408 may optionally receive fluid output from other pumps (not shown). The header pipe 1408 feeds fluid into the system pulsation dampener 1405. The fluid stream 1410 from the outlet of the system pulsation dampener 1405 may flow into a standpipe as described above. Pumps 1401 and 1402 receive fluid streams from separate inlet pipes 1411 and 1412, respectively.

Figure 14B:
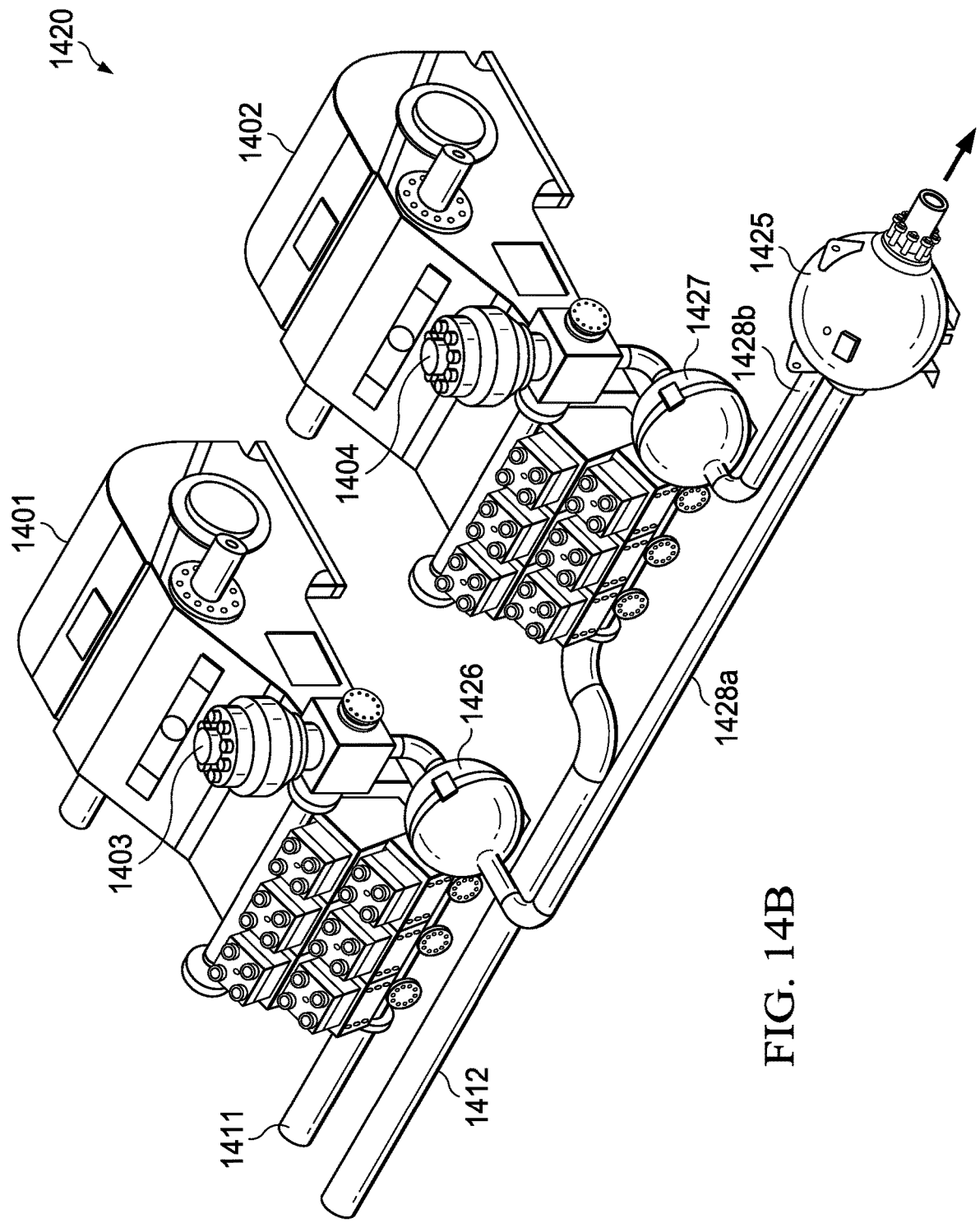

FIG. 14B is a variant of FIG. 14A, and depicts a portion of a multi-pump pump system 1420 that includes a plurality of pumps 1401 and 1402 each pumping fluids and, optionally. A principle difference between FIGS. 14A and 14B is that the system pulsation dampener 1425 of FIG. 14B (corresponding generally to the system pulsation dampener 1405 in FIG. 14A) receives fluid streams from mini-dampeners 1426 and 1427 of FIG. 14B (corresponding generally to the mini-dampeners 1406 and 1407 in FIG. 14A) through separate header pipes 1428a and 1428b rather than through a single header pipe 1408 as in FIG. 14A. Similar to pump system 1400, alternative embodiments of the pump system 1420 in FIG. 14B may include other pumps (not shown) in addition to pumps 1401 and 1402, either with separate header pipes (also not shown) feeding into the system pulsation dampener 1425 or with outlets thereof coupled to one of header pipes 1428a or 1428b.

Figure 14C:
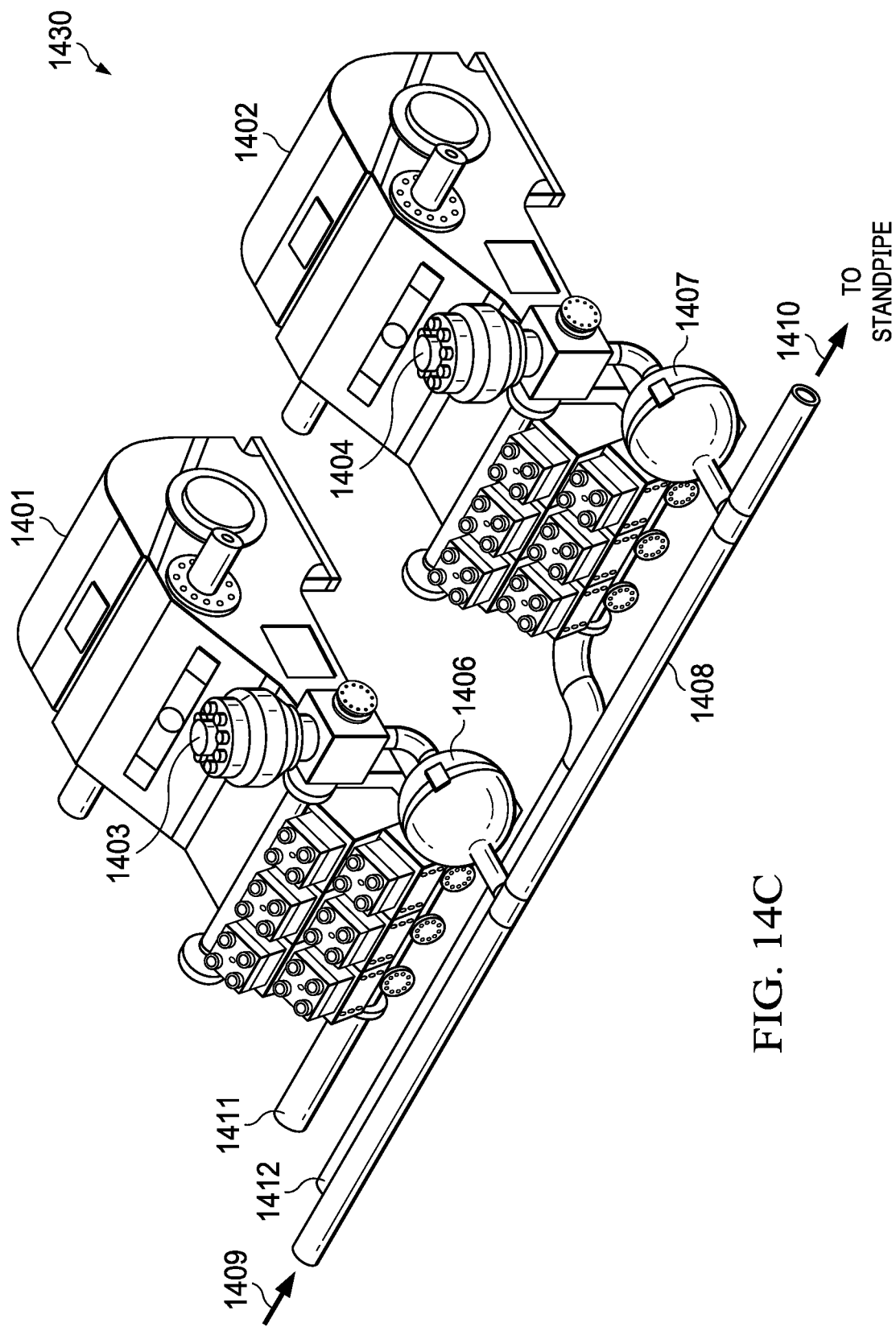
Figure 14D:
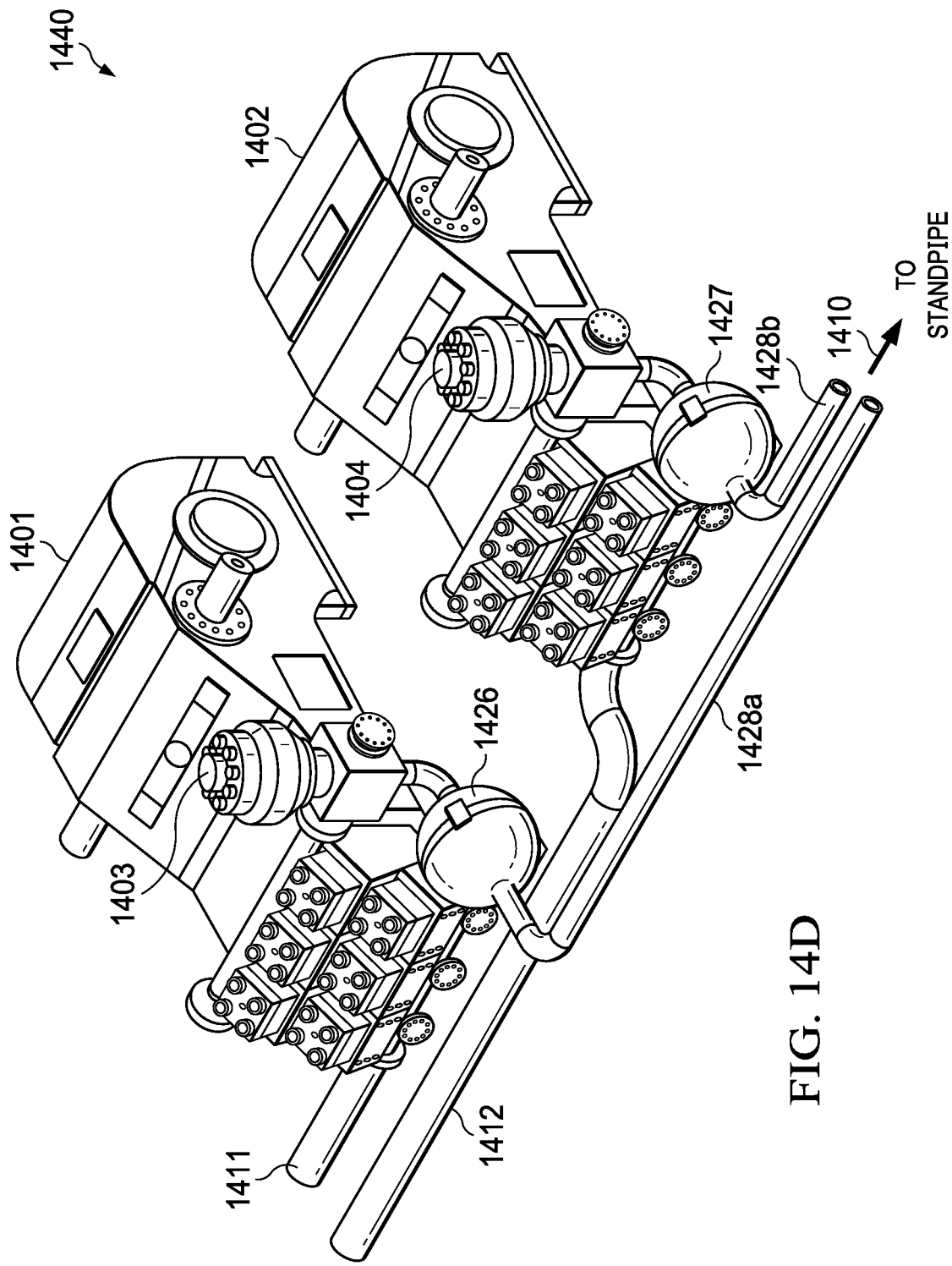

FIGS. 14C and 14D are variants 1430 and 1440 of, respectively, the pump systems 1400 and 1420 in FIGS. 14A and 14B in which the system pulsation dampener 1425 is not included within the pump system 1430 or 1440. Instead, mini-dampeners 1426 and 1427 are used alone, without the system pulsation dampener.

The complete structure of pump systems 1400, 1420, 1430 and 1440 are not depicted in FIGS. 14A through 14D. For example, although not depicted in any of FIGS. 14A through 14D, a suction stabilizer may be coupled to the inlet of one or both of pumps 1401 and 1402, and may use enhanced cellular technology of the type available from Performance Pulsation Control, Inc. Alternatively, in a retrofit application of the type described above, the gas cartridge or cellular compression material may be removed from existing suction stabilizers and either replaced with enhanced cellular material or simply left empty. In addition, a standpipe manifold may be coupled between the pumps 1401 and 1402 and the system pulsation dampener 1405 as described above. Instead of depicting and describing the complete structure and all possible variants, for simplicity and clarity only so much of the pump systems 1400, 1420, 1430 and 1440 as is necessary for an understanding of the principles of the embodiments contemplated by FIGS. 14A-14D are shown and described, together with meaningful variants.

One variant of the pump systems 1400, 1420, 1430 and 1440 that will be apparent from the discussion below is that each pump 1401 and 1402 need not necessarily be fitted with a mini-dampener 1406/1426 or 1407/1427. Instead, multi-pump pump system embodiments including a system pulsation dampener 1405/1425 and a mini-dampener 1406/1426 or 1407/1427 coupled to the outlet of at least one of pumps 1401 and 1402, with no mini-dampener coupled between the outlet of the other of pumps 1401 and 1402 and the header pipe 1408/1428a/1428b, are contemplated by the present disclosure.

Each of system pulsation dampener 1405/1425 and mini-dampeners 1406/1426 and 1407/1427 are preferably reactive dampeners employing a volume and optionally a flow resistance device as described above. For multi-pump systems, a single system pulsation dampener 1405/1425 may not provide acceptable dampening performance due to the piping complexity and the resulting complexity of fluid flow and pressure variations therein. In addition, customizing the size and specific flow resistance devices for a system pulsation dampener 1405/1425 for a particular multi-pump application may be a process with, beyond a certain level, diminishing returns. As a result, it is potentially more cost-effective to develop certain standard sizes of the vessel for system pulsation dampener 1405/1425, together with different configurations of flow resistance device for each size, to allow permutations of size and flow resistance device configuration to approximate the optimal dampening performance for the specific application. Even with the range of solutions available through such permutations, however, the desired or acceptable dampening performance may not be achieved with a single system pulsation dampener 1405/1425. Accordingly, at least one and optionally both pumps 1401 and 1402 are coupled to mini-dampeners 1406/1426 and 1407/1427.

Dampeners 1406/1426 and 1407/1427 are "mini" (or equivalently "small") in that they are, taken alone, undersized and/or otherwise under-configured (e.g., in the flow resistance device(s)) to provide acceptable pulsation dampening for the respective pump 1401 and 1402. However, when combined with system pulsation dampener 1405/1425, mini-dampeners 1406/1426 and 1407/1427 reduce pulsations and system pulsation dampener 1405/1425 removes any lingering pulsations. Pulsation dampening performance need not be perfectly optimized by the combination of system pulsation dampener 1405/1425 and mini-dampeners 1406/1426 and 1407/1427. However, mini-dampener 1406/1426 and/or mini-dampener 1407/1427 improves pulsation dampening performance over the performance provided by system pulsation dampener 1405/1425 alone. Each of system pulsation dampener 1405/1425 and mini-dampeners 1406/1426 and 1407/1427 are individually sized and configured, and are collectively sized and configured, to dampen the magnitude of fluid pressure pulsations within the respective pump system 1400, 1420, 1430 or 1440 to an acceptable level.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A pump system, comprising:
   at least two pumps each having an outlet;
   an appendage reactive dampener attached to the outlet for each of the at least two pumps;
   a mini-dampener attached after the appendage reactive dampener for each of the at least two pumps, wherein the mini-dampeners for each of the at least two pumps are under-configured for providing operational pulsation dampening similar to a single dampener for a respective pump; and
   at least one header pipe receiving flow pumped through the mini-dampener for each of the at least two pumps, combining the pumped flow, and feeding the combined pumped flow into a single pipe connection.

2. The pump system according to claim 1, wherein the single pipe connection is an inlet to a system pulsation dampener, wherein the mini-dampener for each of the at least two pumps is sized and configured to reduce the magnitude of pressure pulsations from an outlet of a respective pump, and wherein the system pulsation dampener is sized and configured to reduce the magnitude of pressure pulsations within the combined flow after being pumped through the mini-dampeners for each of the at least two pumps.

3. The pump system according to claim 2, wherein the at least one header pipe comprises a single header pipe carrying the combined flow from the at least two pumps into the system pulsation dampener.

4. The pump system according to claim 2, wherein the system pulsation dampener is a reactive dampener employing a flow resistance device.

5. The pump system according to claim 1, wherein at least one of the appendage reactive dampeners is formed by removing a bladder from a shell of a gas-charged pulsation dampener.

6. The pump system according to claim 1, wherein at least one of the appendage reactive dampeners is formed by removing a compression material from a shell of a charge-free design dampener.

7. The pump system according to claim 1, wherein the mini-dampener for each of the at least two pumps is a reactive dampener employing a flow resistance device.

8. A method, comprising:
   connecting at least two pumps each having an outlet to a combined flow;
   coupling an appendage reactive dampener to each of the at least two pumps;
   coupling a mini-dampener after the appendage reactive dampener for each of the at least two pumps, each mini-dampener sized and configured to reduce a magnitude of pressure pulsations from an outlet of the respective pump, wherein a reduction caused by the mini-dampeners for each of the at least two pumps is under-configured for providing operational pulsation dampening similar to a single dampener for a respective pump;
   receiving, at at least one header pipe, flow pumped through the mini-dampeners for each of the at least two pumps;
   combining the pumped flow; and
   feeding the combined pumped flow into a single pipe connection.

9. The method according to claim 8, wherein the single pipe connection is an inlet to a system pulsation dampener.

10. The method according to claim 9, wherein the at least one header pipe comprises a single header pipe carrying the combined flow from the at least two pumps into the system pulsation dampener.

11. The method according to claim 9, wherein the system pulsation dampener is a reactive dampener employing a flow resistance device.

12. The method according to claim 8, further comprising:
   forming one of the appendage reactive dampeners by removing a bladder from a shell of a gas-charged pulsation dampener.

13. The method according to claim 8, wherein further comprising:
   forming one of the appendage reactive dampeners by removing a compression material from a shell of a charge-free design dampener.

14. The method according to claim 8, wherein the mini-dampeners for each of the at least two pumps are each a reactive dampener employing a flow resistance device.

* * * * *